(12) United States Patent
Railey et al.

(10) Patent No.: US 10,689,077 B1
(45) Date of Patent: Jun. 23, 2020

(54) WATER PUMP FOR WATERCRAFT

(71) Applicants: Michael Railey, Del Mar, CA (US);
Leonard Stobar, Santee, CA (US)

(72) Inventors: Michael Railey, Del Mar, CA (US);
Leonard Stobar, Santee, CA (US)

( * ) Notice: Subject to any disclaimer, the term of this patent is extended or adjusted under 35 U.S.C. 154(b) by 0 days.

(21) Appl. No.: 16/570,967

(22) Filed: Sep. 13, 2019

(51) Int. Cl.
| | |
|---|---|
| *B63H 11/04* | (2006.01) |
| *B63H 11/103* | (2006.01) |
| *B63B 34/20* | (2020.01) |
| *B63H 11/01* | (2006.01) |
| *B63H 21/17* | (2006.01) |
| *B63H 11/12* | (2006.01) |
| *B63H 11/00* | (2006.01) |
| *F04D 29/70* | (2006.01) |

(52) U.S. Cl.
CPC .............. *B63H 11/04* (2013.01); *B63B 34/20* (2020.02); *B63H 11/01* (2013.01); *B63H 11/103* (2013.01); *B63H 11/12* (2013.01); *B63H 21/17* (2013.01); *F04D 29/708* (2013.01); *B63H 2011/008* (2013.01)

(58) Field of Classification Search
CPC ....... B63H 11/04; B63H 11/103; B63H 11/01; B63H 21/17; B63B 34/20
See application file for complete search history.

(56) References Cited

U.S. PATENT DOCUMENTS

| | | | | |
|---|---|---|---|---|
| 3,194,205 | A * | 7/1965 | Mattson ................. | B63H 20/00 440/38 |
| 3,658,028 | A | 4/1972 | Koons | |
| 3,985,094 | A * | 10/1976 | Stricker ................. | B63H 11/08 440/47 |
| 4,290,760 | A | 9/1981 | Lindblad | |
| 4,538,996 | A * | 9/1985 | Inwood ................. | B63H 11/08 440/38 |
| 4,942,838 | A * | 7/1990 | Boyer ..................... | B63B 7/087 114/345 |
| 5,356,319 | A * | 10/1994 | Parker .................. | B63B 35/665 440/111 |
| 5,481,997 | A * | 1/1996 | Arndt .................... | B63B 34/20 114/347 |

(Continued)

FOREIGN PATENT DOCUMENTS

| | | | | |
|---|---|---|---|---|
| GB | | 2032871 A * | 5/1980 | ............. B63H 21/30 |
| WO | WO 2014/150752 | | 9/2014 | |

(Continued)

OTHER PUBLICATIONS

International Search Report and Written Opinion dated Apr. 21, 2016, issued in Application No. PCT/US2015/055598 (10 pages).

(Continued)

*Primary Examiner* — Ajay Vasudeva
(74) *Attorney, Agent, or Firm* — Knobbe Martens Olson & Bear LLP

(57) ABSTRACT

A self-propelling watercraft system is provided. The watercraft has a base with a plurality of sidewalls extending from the base to form a cockpit. The base also has a recess, where a pump can detachably connect to the hull within the recess. The pump has an intake valve on a first end and a nozzle on a second end that is opposite the first end. The intake valve can intake water. The nozzle can jettison water received in the pump from the intake valve and agitate water surrounding the nozzle.

22 Claims, 39 Drawing Sheets

(56) References Cited

U.S. PATENT DOCUMENTS

| | | | |
|---|---|---|---|
| 5,765,499 A * | 6/1998 | McKenzie | B63H 11/08 |
| | | | 114/153 |
| 5,769,674 A | 6/1998 | Stallman | |
| 5,937,785 A * | 8/1999 | Murray, III | B63H 21/24 |
| | | | 114/347 |
| 6,223,712 B1 | 5/2001 | Montgomery | |
| 6,533,622 B1 * | 3/2003 | Zwaan | B63H 11/102 |
| | | | 440/38 |
| 7,507,128 B2 * | 3/2009 | West | B63B 34/10 |
| | | | 440/38 |
| 9,718,528 B2 * | 8/2017 | Railey | B63H 21/24 |
| 2004/0002282 A1 | 1/2004 | Lee | |
| 2005/0268833 A1 | 12/2005 | Conrad | |
| 2011/0104963 A1 | 5/2011 | Ellis et al. | |
| 2011/0201238 A1 | 8/2011 | Rott et al. | |
| 2011/0311376 A1 * | 12/2011 | Wang | B63H 11/00 |
| | | | 417/201 |
| 2013/0059489 A1 | 3/2013 | Vlock et al. | |

FOREIGN PATENT DOCUMENTS

| | | | |
|---|---|---|---|
| WO | WO-2016006987 A2 * | 1/2016 | B63H 11/08 |
| WO | WO 2016/061274 | 4/2016 | |

OTHER PUBLICATIONS

International Preliminary Report on Patentability dated Apr. 18, 2017, issued in Application No. PCT/US2015/055598 (8 pages).
International Search Report and Written Opinion dated Sep. 15, 2015, issued in Application No. PCT/US2014/024130 (7 pages).
International Preliminary Report on Patentability dated Sep. 15, 2015, issued in Application No. PCT/US2014/024130 (5 pages).

* cited by examiner

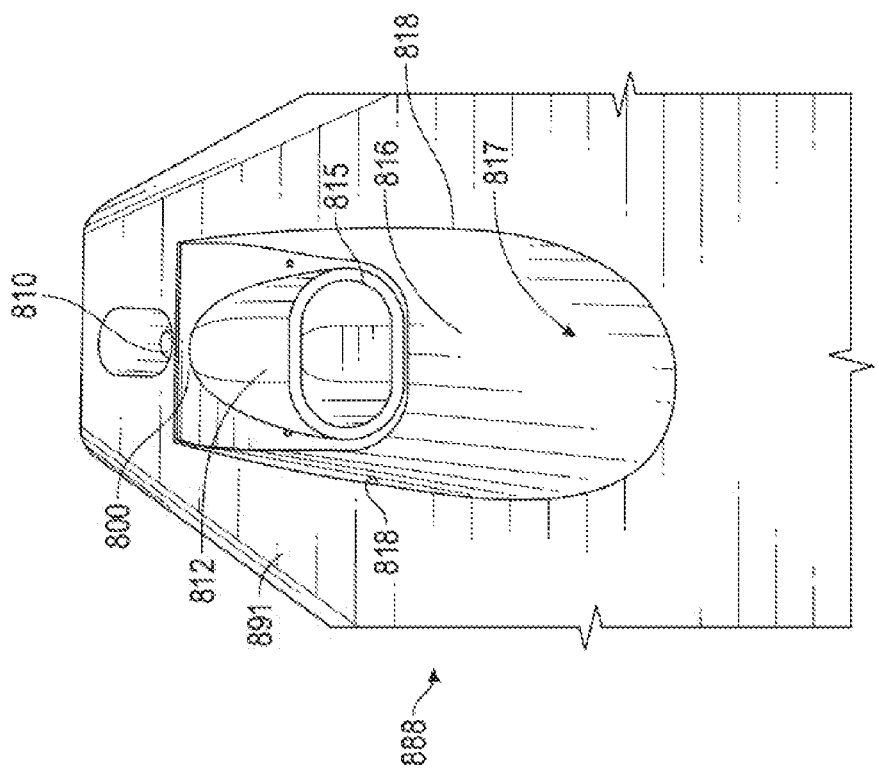

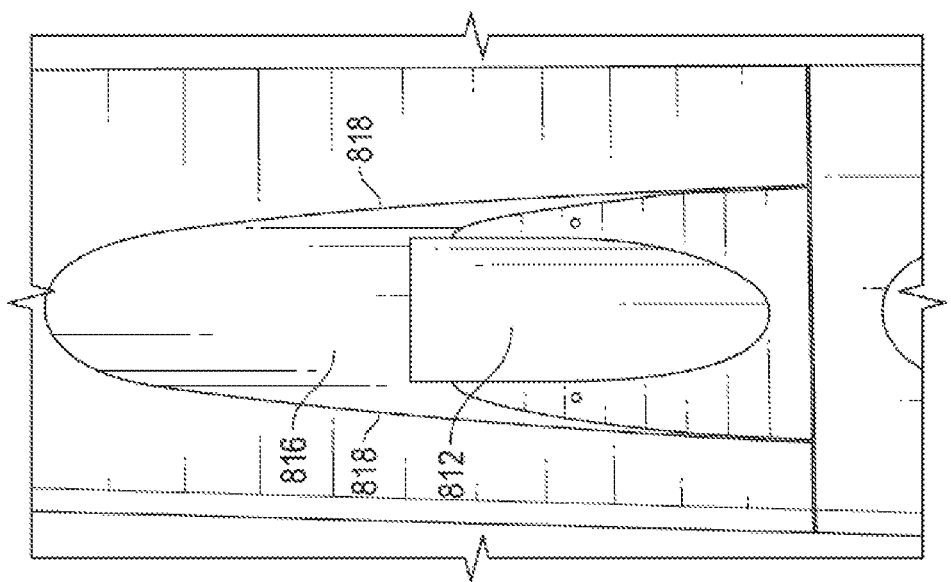

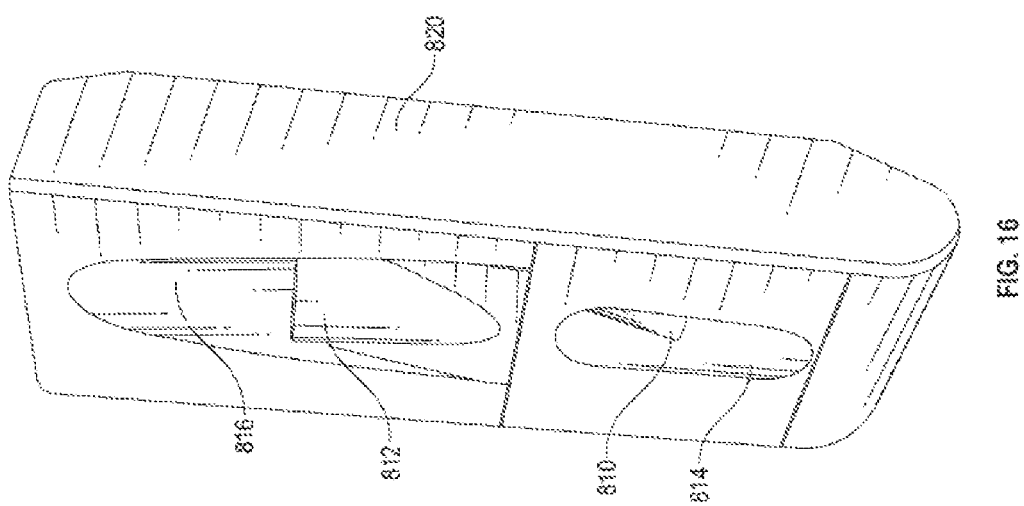

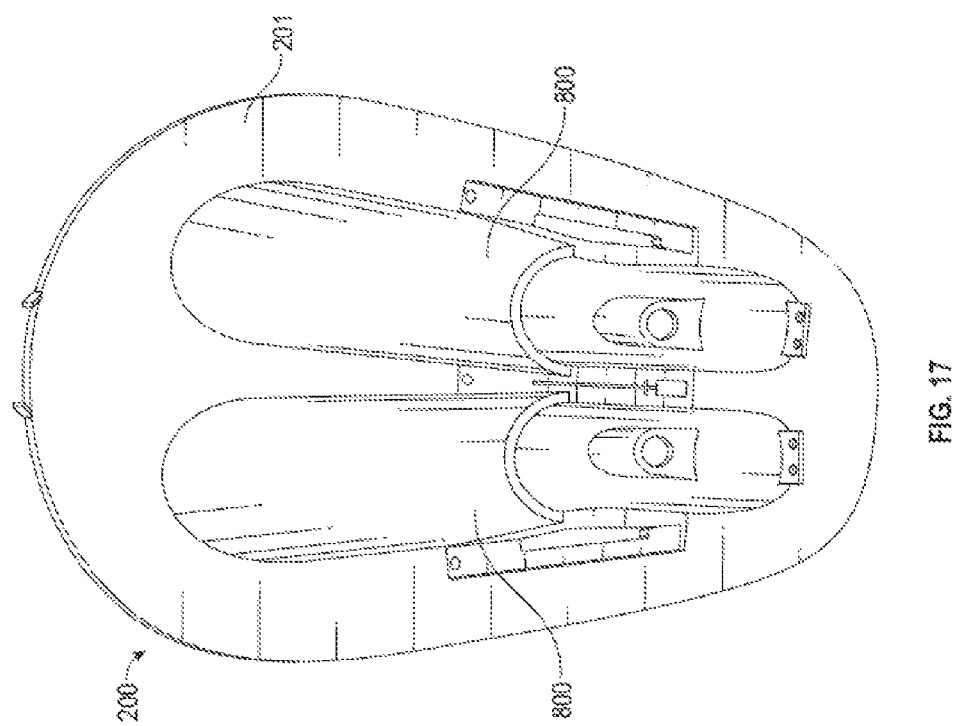

WATER PUMP FOR WATERCRAFT

BACKGROUND

Field

This application relates to a water jet pump system for use on a watercraft.

Description

Personal watercrafts, such as, for example, kayaks, canoes, and paddleboards are typically maneuvered by a user using a paddle. In these instances, a user uses the paddle to propel and steer the watercraft. Using a paddle to maneuver a watercraft can tire a user, making maneuvering a watercraft difficult over an extended period of time. In some instances, personal watercrafts can include a motorized propeller, which can increase maneuverability.

SUMMARY

Using a motorized propeller on a personal watercraft can have several drawbacks. In some instances, a user has to purchase a personal watercraft which is designed and fabricated to include a motorized propeller. This situation could be a drawback for users who already own a personal watercraft, but the watercraft cannot be retrofitted with a motorized propeller. Thus, in these situations, a user would have to own and store two separate watercrafts. In some instances, the personal watercraft can be retrofitted with a motorized propeller. However, motorized propellers are often bulky, heavy, and burdensome to install. Furthermore, because the propeller extends below the hull of the watercraft, operators will need to be concerned with using a propeller system in shallow water or when removing the watercraft from the water as the propeller could contact the floor or other object. Additionally, in situations where a user would prefer to paddle, the user would have to paddle the personal watercraft while hauling a bulky and heavy motorized propeller, or take time to uninstall the propeller in advance. Another drawback involves the safety risks propellers pose to swimmers and aquatic life. Propellers are often exposed in the water, and as a result, could injure a nearby swimmer or animal who comes into contact with the propeller. Additionally, propellers are more prone to fouling when compared with other means of propulsion.

The pump systems described herein may have several advantages over motorized propellers. For example, in one embodiment, a self-propelling watercraft system is provided. The watercraft has a base with a plurality of sidewalls extending from the base to form a cockpit. The base also has a recess, where a pump can detachably connect to the hull within the recess. The pump has an intake port on a first end and a nozzle on a second end that is opposite the first end. The intake port is configured to intake water. The nozzle is configured to jettison water received in the pump from the intake port and to agitate water surrounding the nozzle.

In another embodiment, a self-propelling watercraft system is provided. The watercraft has a base with a plurality of sidewalls extending from the base to form a cockpit. An opening extends from the base, the opening having an open top and bottom. A pump detachably connects to the hull within the opening. The pump has an intake port on a first end and a nozzle on a second end that is opposite the first end. The intake port is configured to intake water. The nozzle is configured to jettison water received in the pump from the intake port and to agitate water surrounding the nozzle, which creates thrust in a first direction. A motor is mechanically connected to the pump and is configured to be placed within the opening. The motor is configured to adjust the amount of thrust.

In another embodiment, a self-propelling watercraft system is provided. The watercraft has a base with a plurality of sidewalls extending from the base to form a cockpit. The base also has a recess, where a pump can detachably connect to the hull within the recess. The connection between the pump and the hull forms an approximately flush surface. The pump has an intake port on a first end and a nozzle on a second end that is opposite the first end. The intake port is configured to intake water. The nozzle is configured to jettison water received in the pump from the intake port and to agitate water surrounding the nozzle.

In another embodiment, a self-propelling watercraft system is provided. The watercraft has a base with a plurality of sidewalls extending from the base to form a cockpit. The base also has an opening, where a pump can detachably connect to the hull within the recess. The connection between the pump and the opening seals the hull. The pump has an intake port on a first end and a nozzle on a second end that is opposite the first end. The intake port is configured to intake water. The nozzle is configured to jettison water received in the pump from the intake port and to agitate water surrounding the nozzle.

In another embodiment, a self-propelling watercraft system is provided. The watercraft has a base with a plurality of sidewalls extending from the base to form a cockpit. Connected to an end of the hull is a pump housing. The pump housing includes a steering mechanism connected to an upper end of the pump housing. The steering mechanism allows the pump housing to rotate. The pump housing also has a recess formed in a lower end of the pump housing. A pump is detachably connected to the pump housing within the recess. The pump has an intake port on a first end and a nozzle on a second end that is opposite the first end. The intake port is configured to intake water. The nozzle is configured to jettison water received in the pump from the intake port and to agitate water surrounding the nozzle.

BRIEF DESCRIPTION OF THE DRAWINGS

The abovementioned and other features disclosed herein are described below with reference to the drawings of the preferred embodiments. The illustrated embodiments are intended to illustrate, but not to limit the disclosure. The drawings contain the following figures.

FIG. 1A shows a top perspective view and FIG. 1B shows a bottom perspective view.

FIG. 6 is a partial perspective top-side view of a portion of a kayak having an opening for receiving there through.

As shown, the cover of the housing of the pump system is removed to show some of the components of the pump system.

Figure 1A:
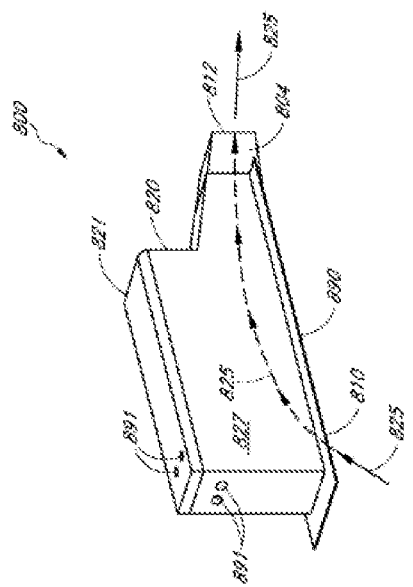
FIGS. 1A and 1B show perspective views of an embodiment of a pump system.
Figure 1B:
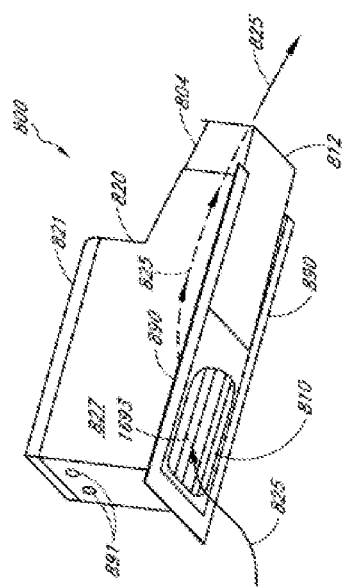
Figure 8:
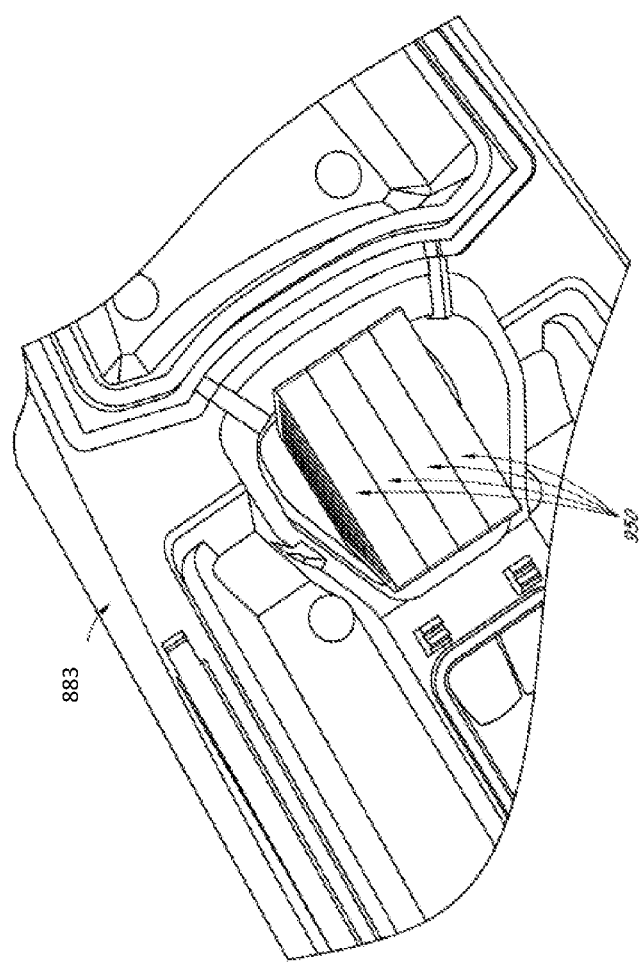

FIG. 8 is a perspective top-side view of a kayak with a pump system of FIGS. 1A and 1B secured within an opening in the kayak. A plurality of batteries are positioned on top of the pump system.

Figure 9:
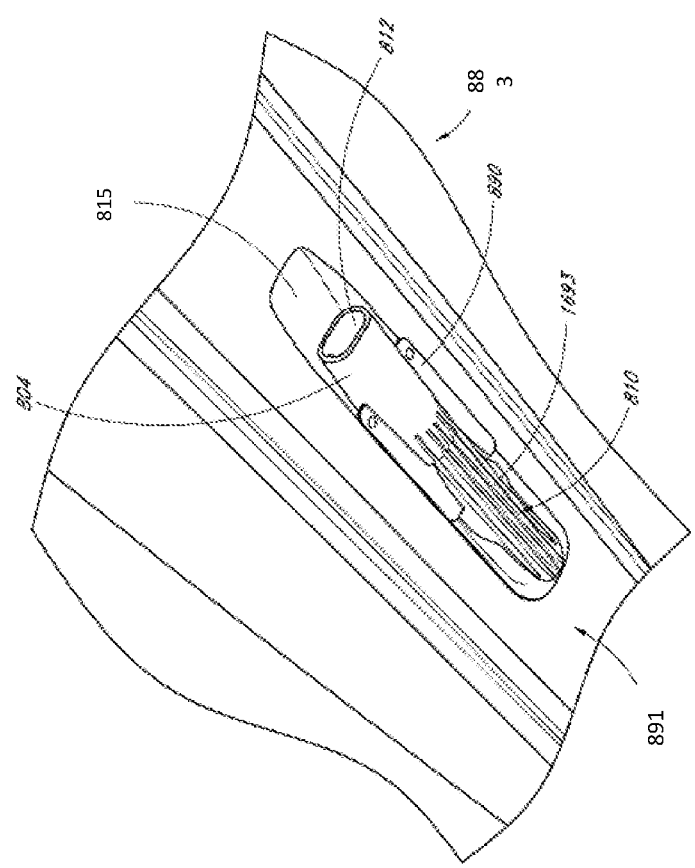

FIG. 9 is a perspective bottom-side view of a kayak with a pump system secured within an opening in the kayak.

Figure 10:
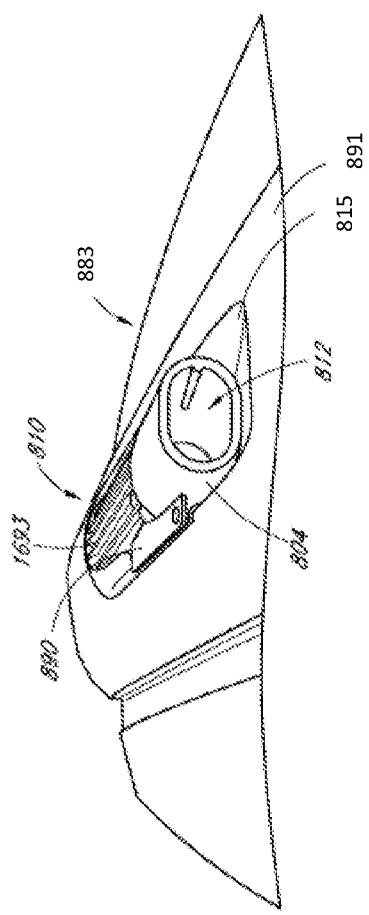

FIG. 10 is another perspective bottom-side view of a kayak with a pump system secured within an opening in the kayak.

Figure 11:
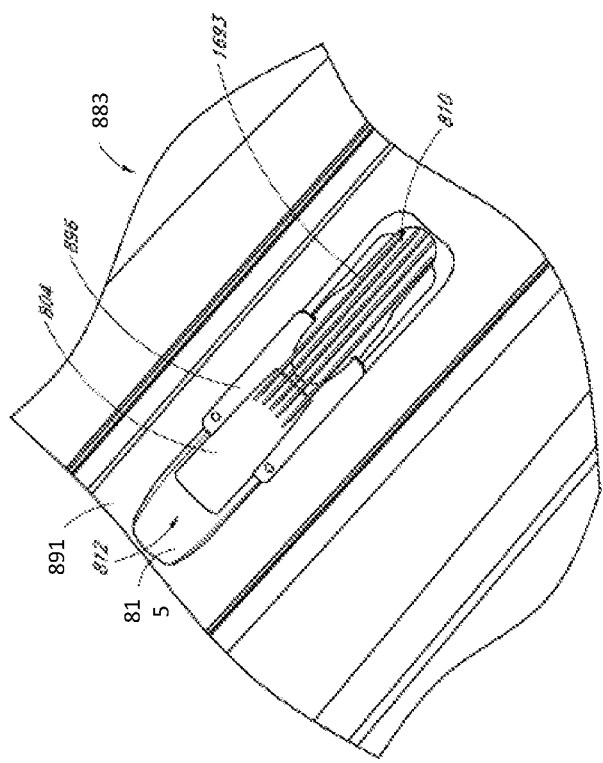

FIG. 11 is a bottom-side view of a kayak with a pump system secured within an opening in the kayak.

Figure 12:
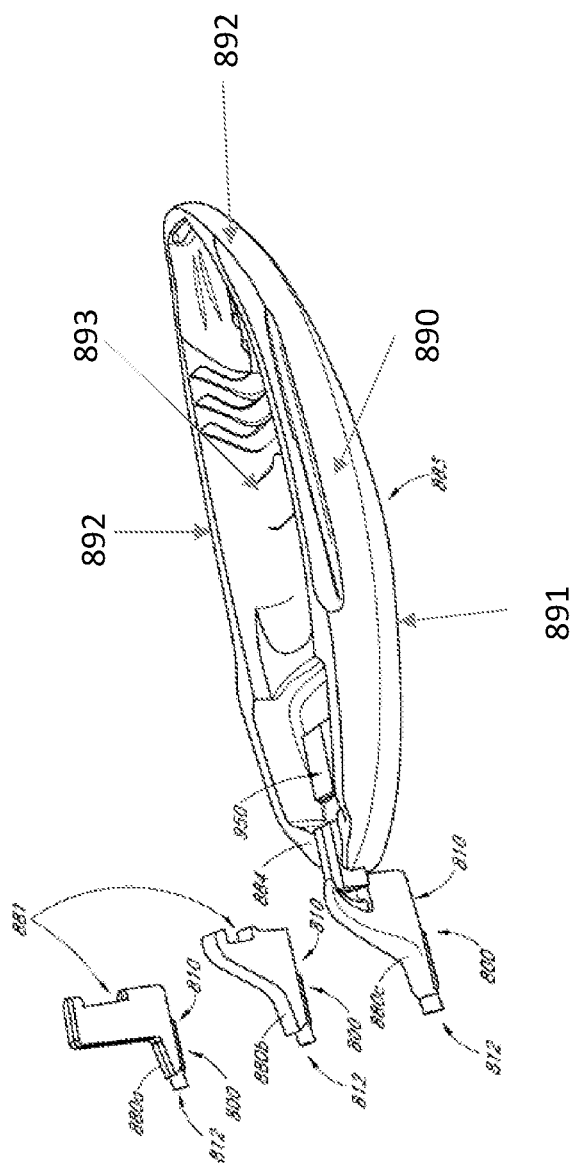

FIG. 12 is a perspective view of a kayak and three sample embodiments of a motor mount for the pump systems described herein.

FIGS. 13A through 13F depicts side views of various embodiments of motor mounts for use with the pump systems described herein, as well as views of the arrangement of the pump system and batteries therein.

FIG. 14 is a perspective view of a pump system installed in a kayak.

FIG. 15 is a bottom view of a pump system installed in a kayak.

FIG. 16 is a perspective view of a pump system.

FIG. 17 a perspective view of a dual pump system.

Figure 18:
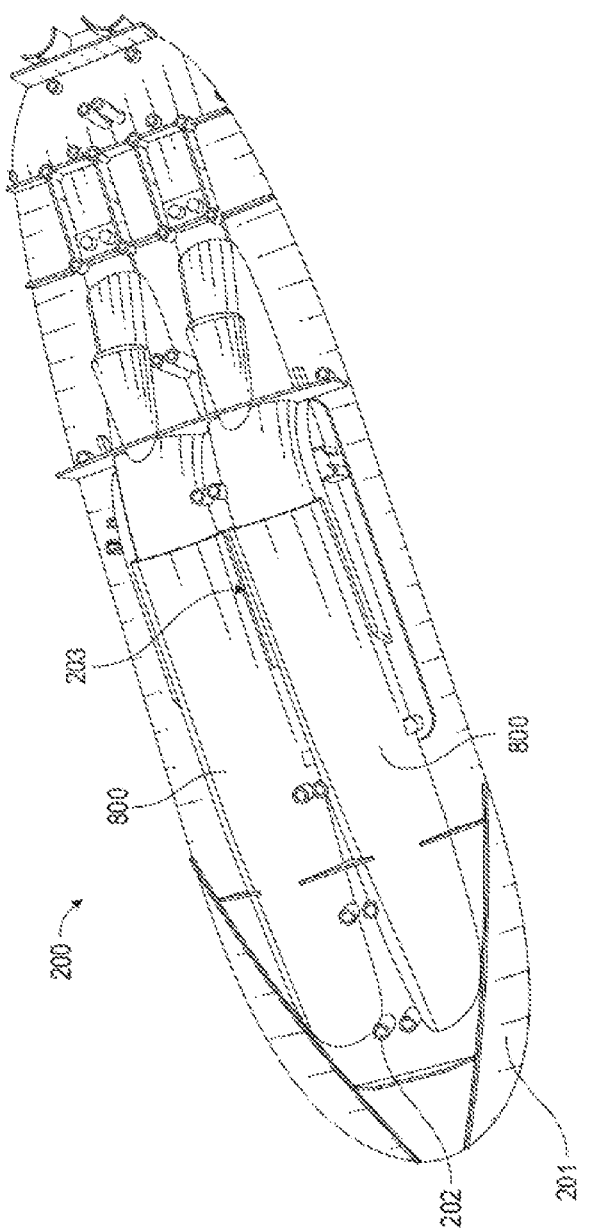

FIG. 18 is a perspective view of a dual pump system.

Figure 19:
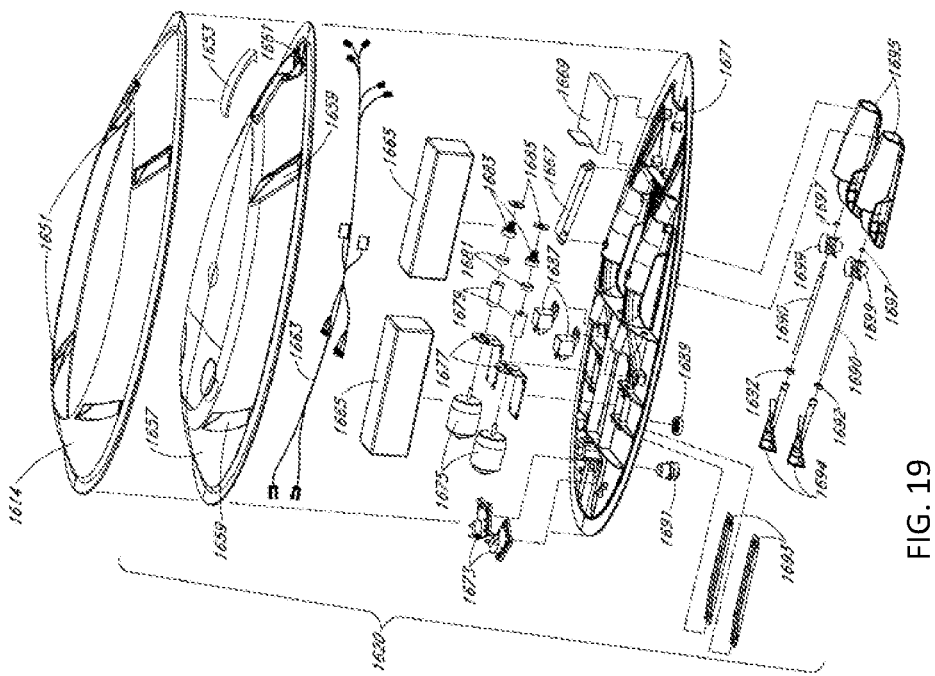

FIG. 19 is an exploded view of a pump system.

Figure 20:
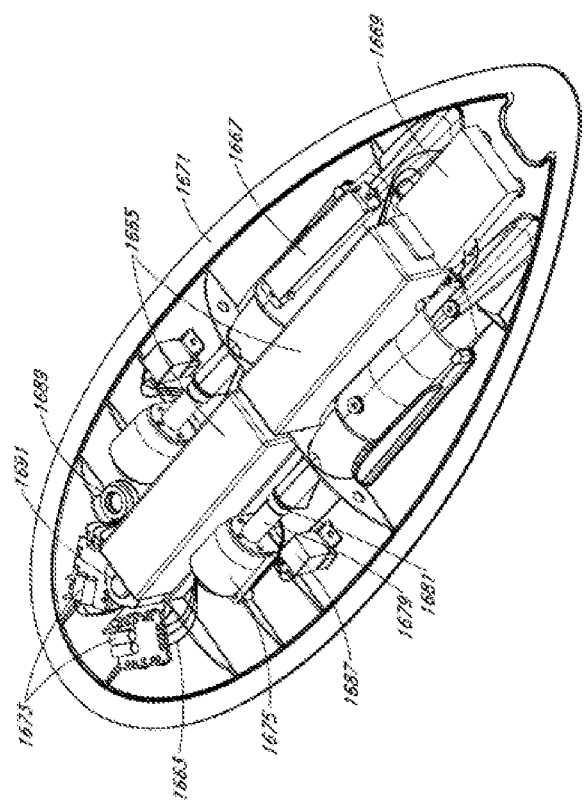

FIG. 20 is a perspective cutaway view of the pump system of FIG. 19.

Figure 21:
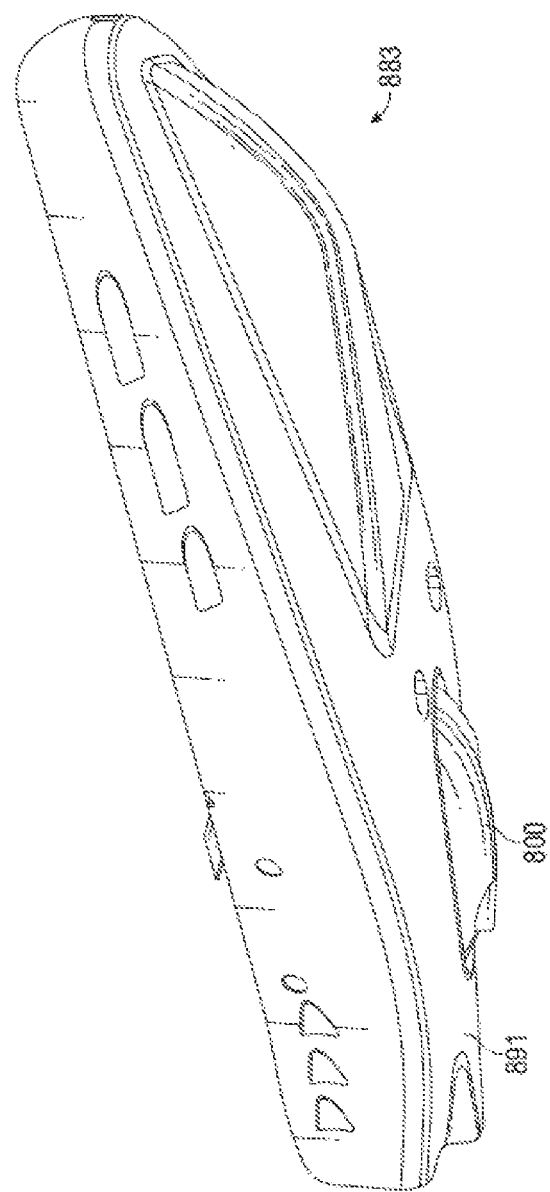

FIG. 21 is a side view of a kayak with a pump system installed.

Figure 22:
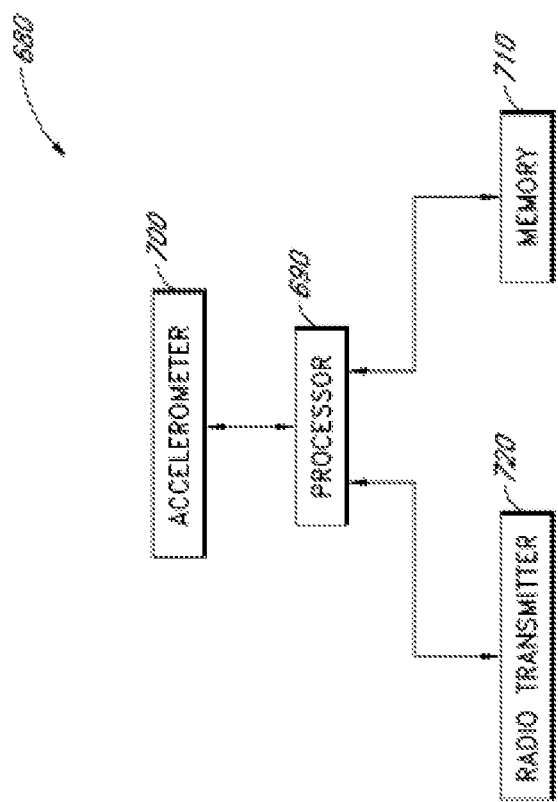

FIG. 22 is a block drawing showing one embodiment of a drive control system.

Figure 23:
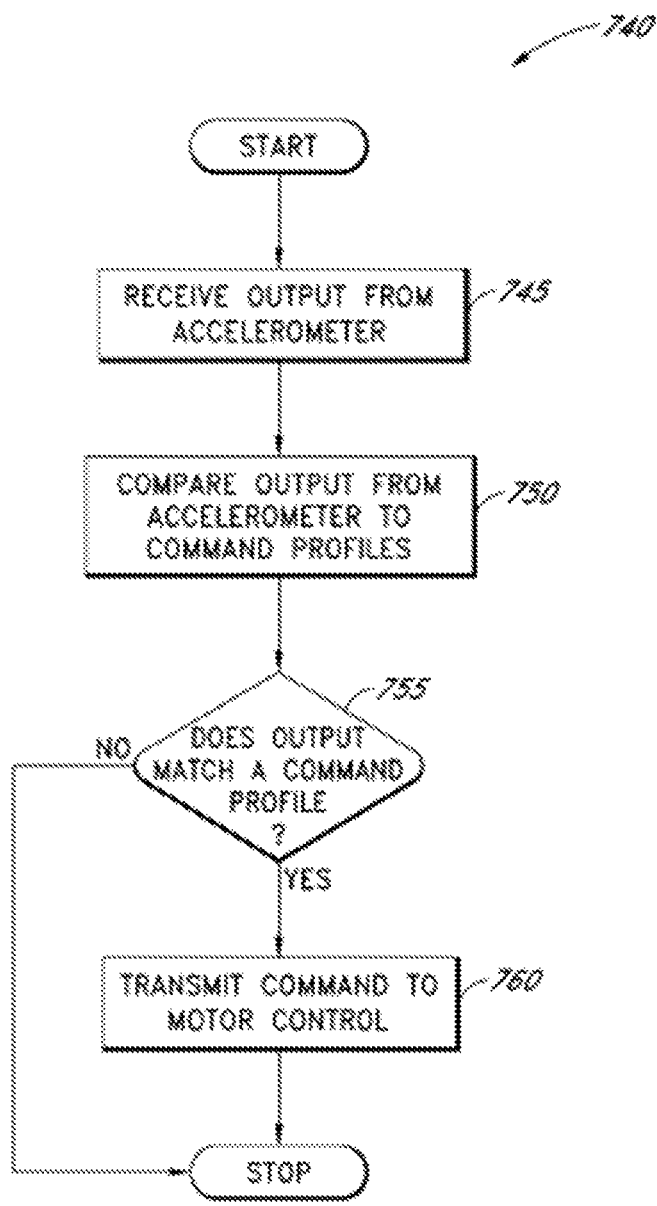

FIG. 23 is a flow chart illustrating a method for using the drive control system of FIG. 22.

Figure 24:
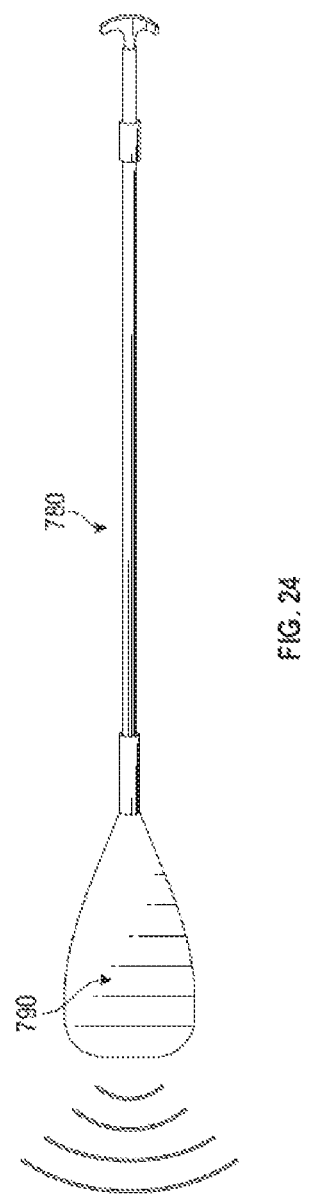

FIG. 24 is a top view of a paddle with a drive control system installed.

Figure 25:
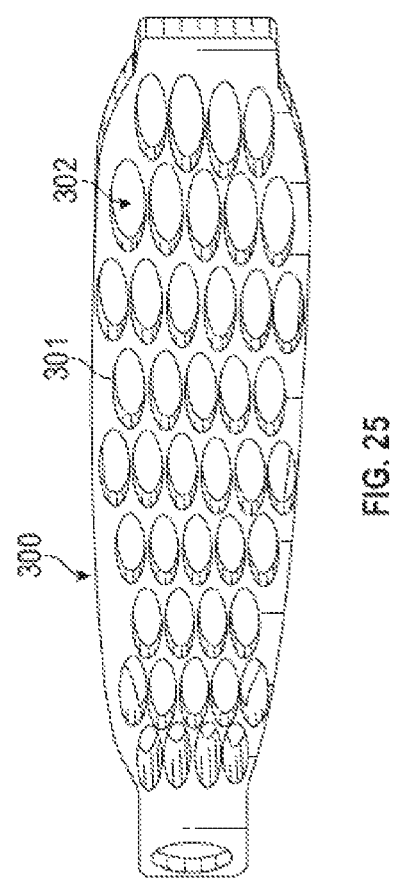
Figure 26:
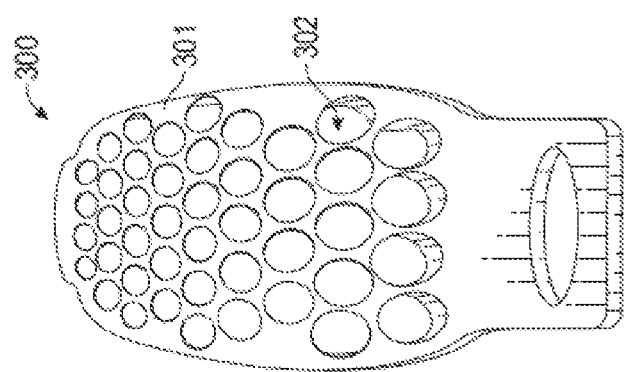

FIG. 25 is a top view of a grate,

FIG. 26 is a top perspective view of a grate.

Figure 27:
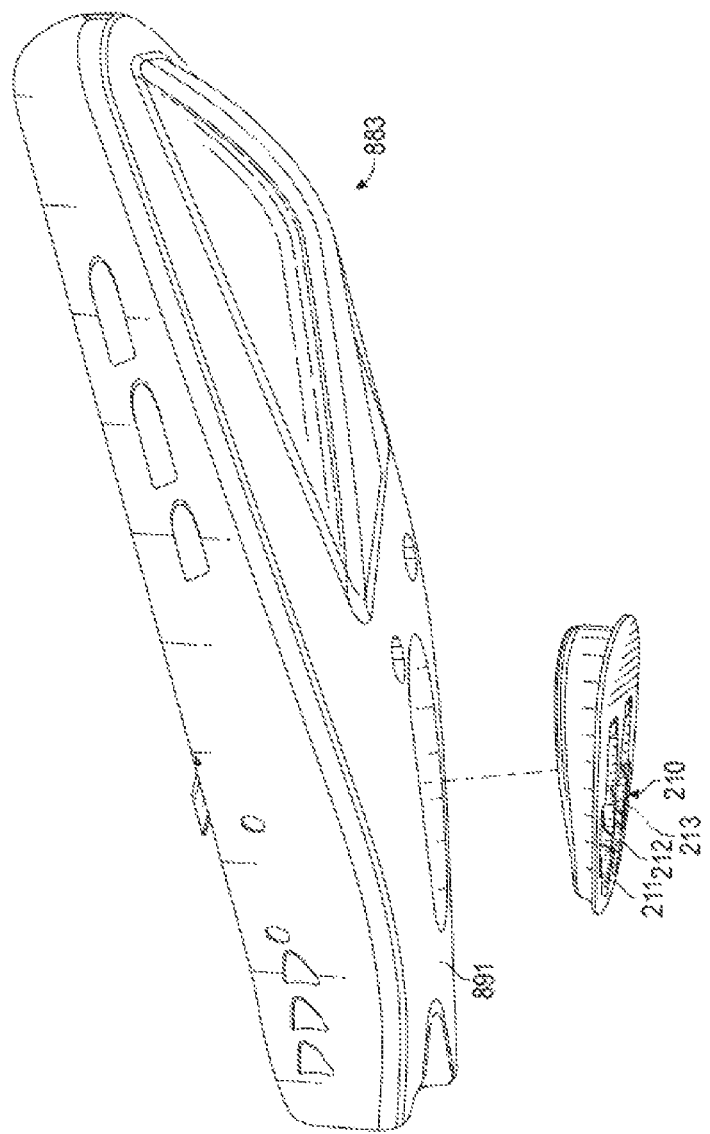

FIG. 27 is a bottom perspective view of a dual recess on a kayak.

Figure 28:
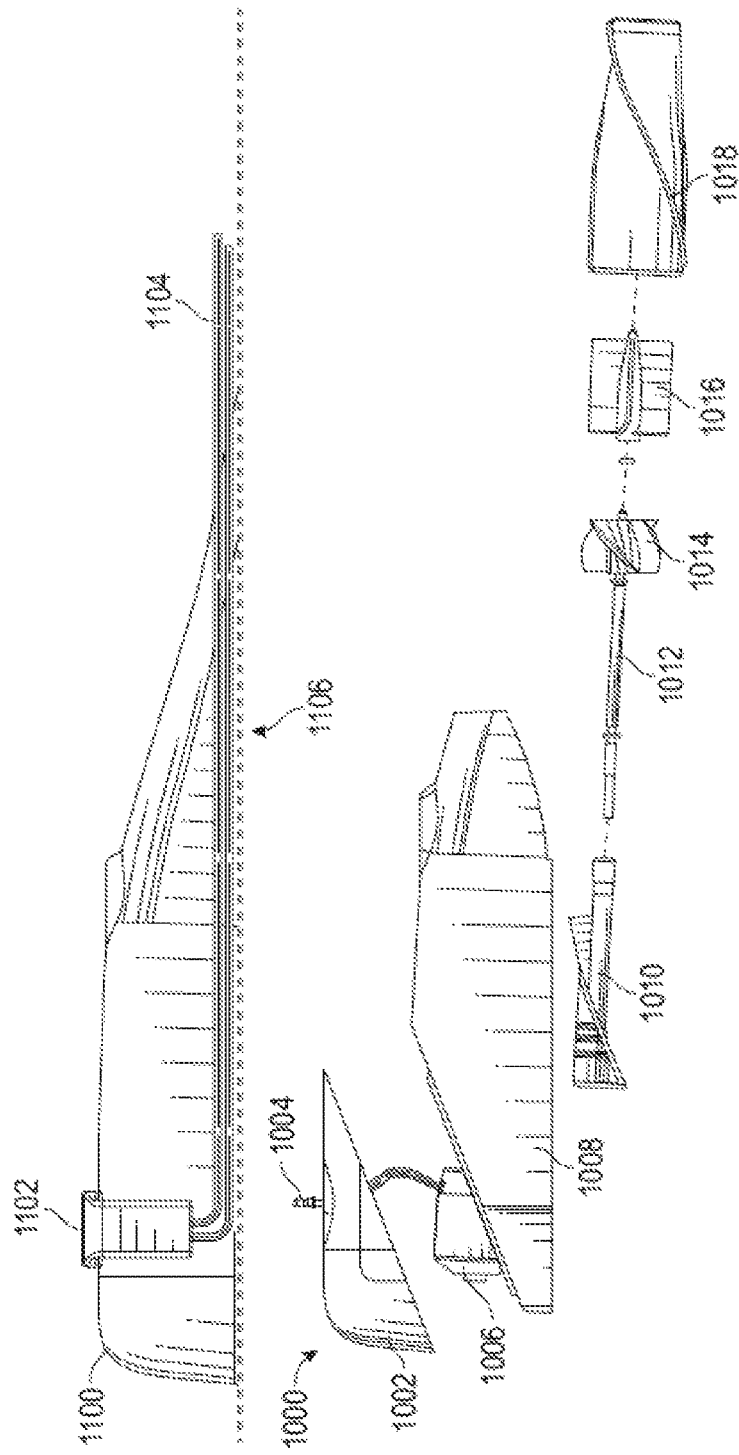

FIG. 28 is an exploded view of a pump system.

Figure 29:
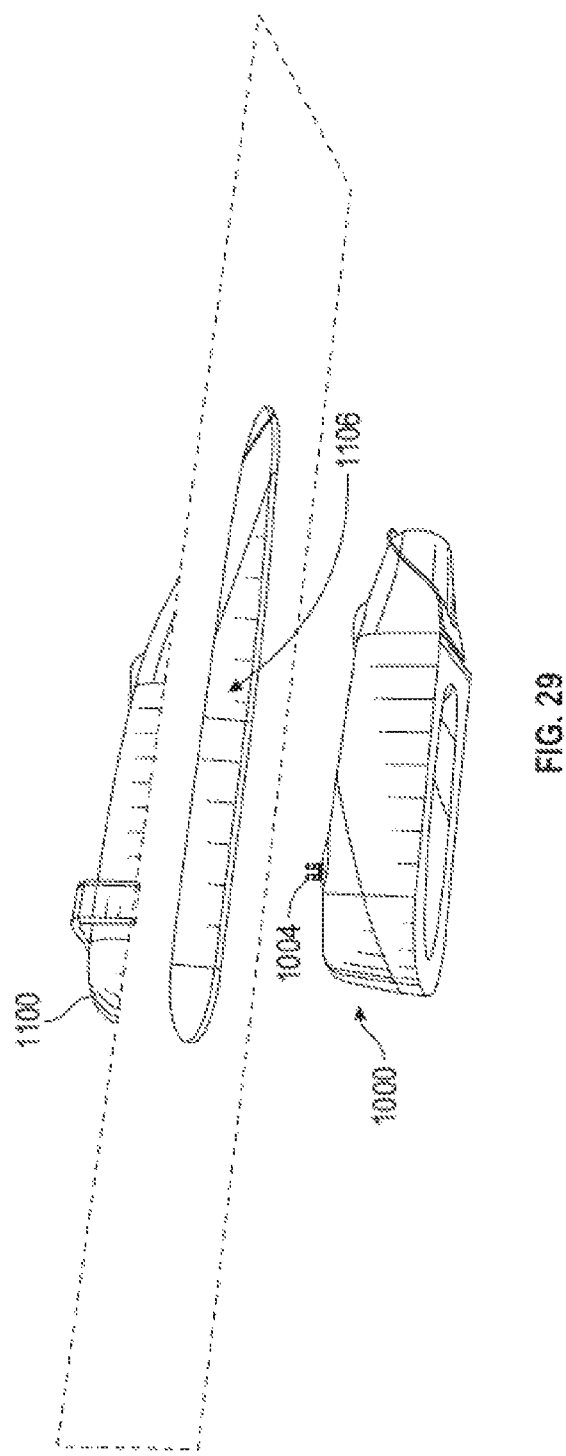

FIG. 29 is a partial exploded view of a pump system and a recess on a kayak.

Figure 30:
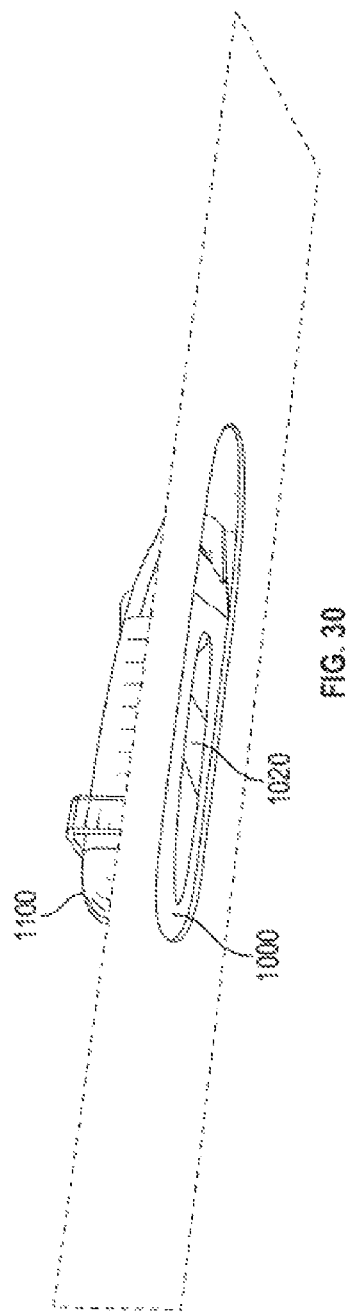

FIG. 30 is a bottom perspective view of a pump system installed in a kayak.

Figure 31:
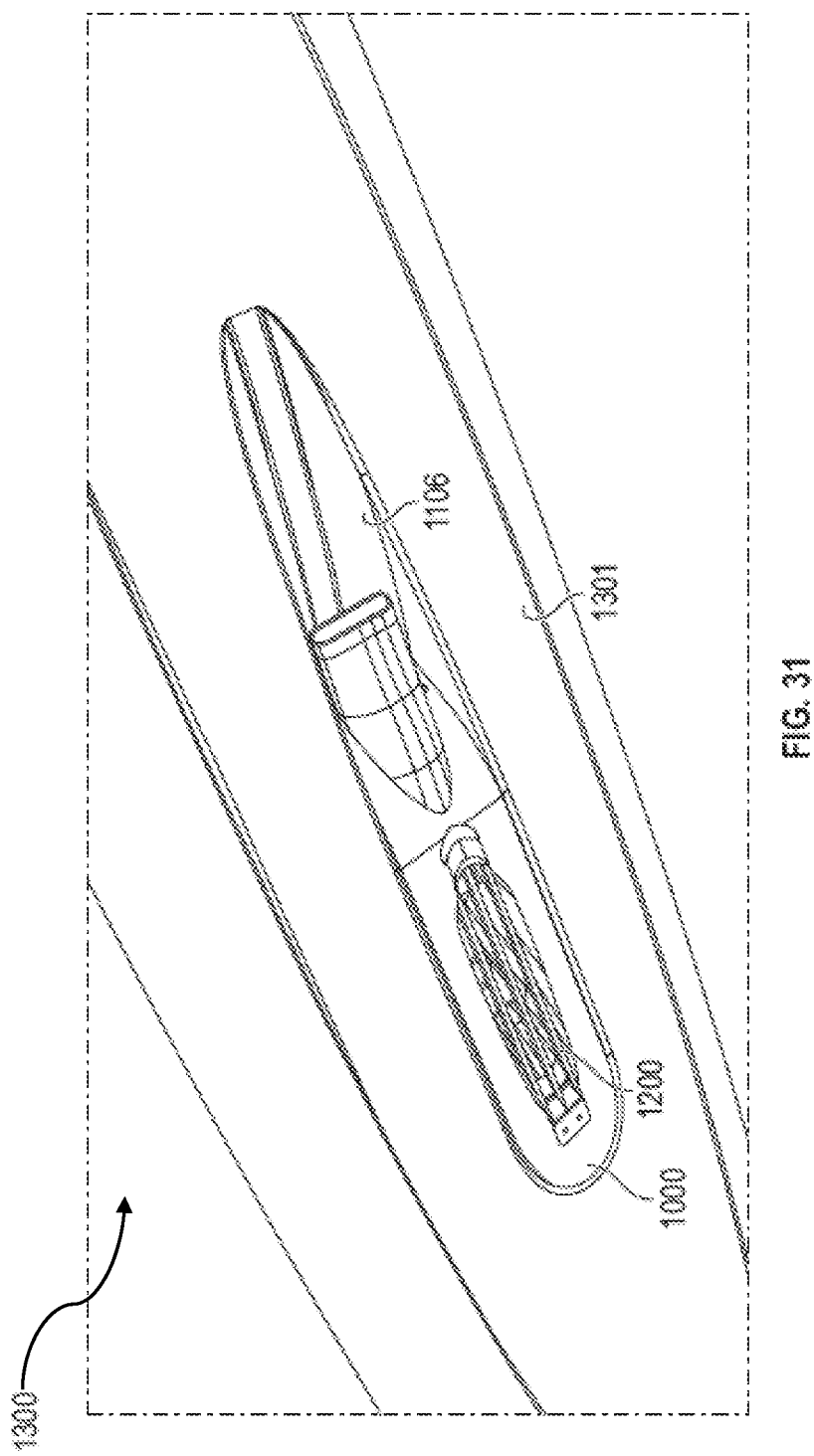

FIG. 31 is a bottom perspective view of a pump system installed in a kayak.

Figure 32:
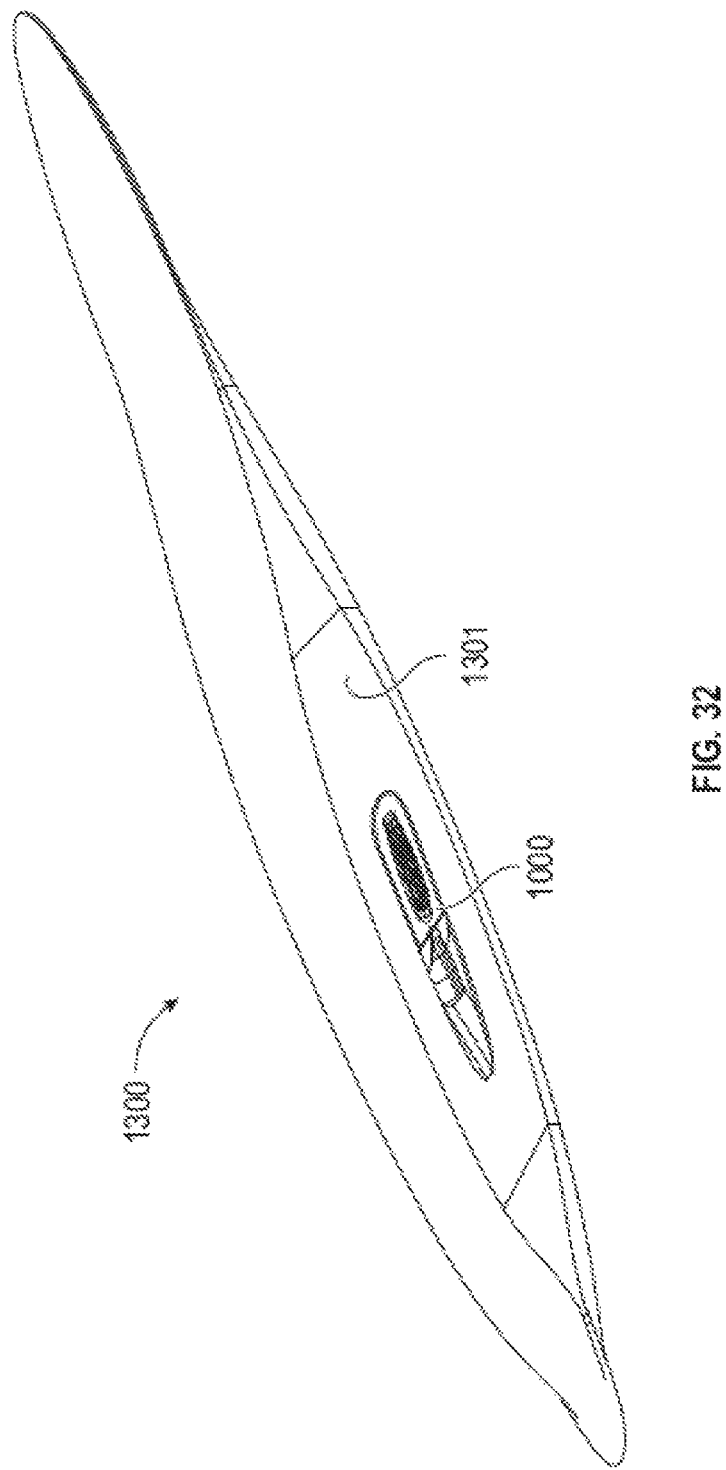

FIG. 32 is a bottom perspective view of a pump system installed in a kayak.

Figure 33:
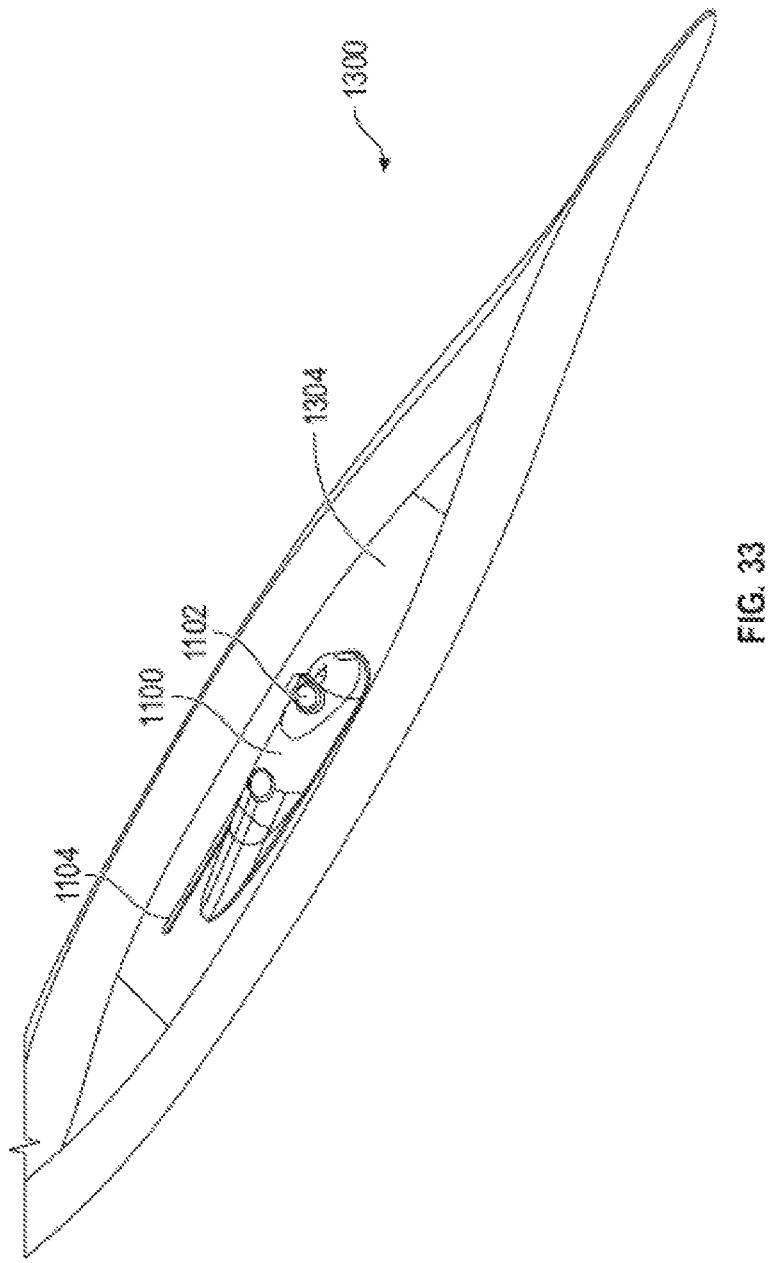

FIG. 33 is a top perspective view of a kayak with a pump recess wall.

DETAILED DESCRIPTION OF CERTAIN PREFERRED EMBODIMENTS

Many operators of a personal watercrafts can suffer from maneuverability issues. Personal watercrafts, such as kayak, are often maneuvered by the operator using a paddle to steer and propel the watercraft. Using a paddle can cause an operator to tire after paddling for an extending period. Additionally, it can be difficult to quickly accelerate a personal watercraft. These issues can create problems for operators who are using a personal watercraft to travel long distances or those who are trying to maneuver a watercraft in congested docking areas. Connecting a water jet pump to the personal watercraft can improve the mobility and maneuverability of a watercraft.

Figure 3:
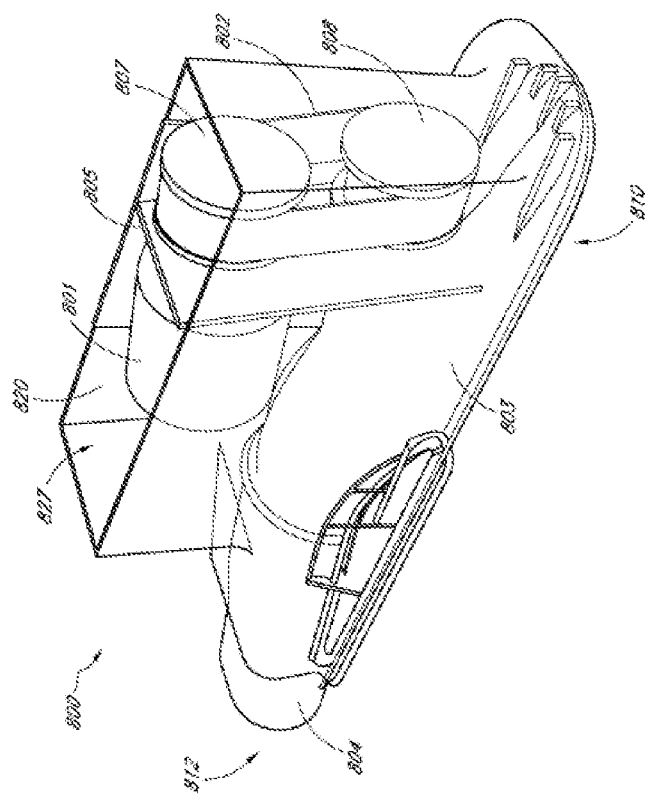
FIG. 3 is a perspective, partially transparent, schematic view of the pump system of FIGS. 1A and 1B.
Figure 4:
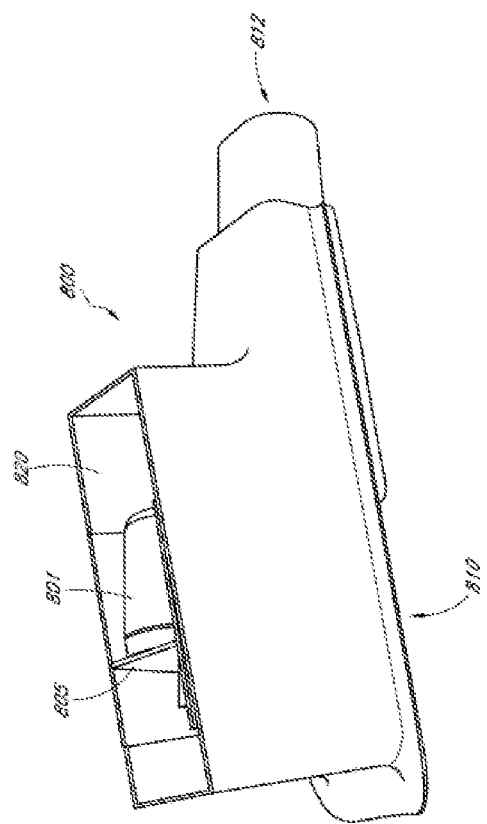
FIG. 4 is a perspective, schematic view of the pump system of FIGS. 1A and 1B shown with the cover removed.
Figure 5:
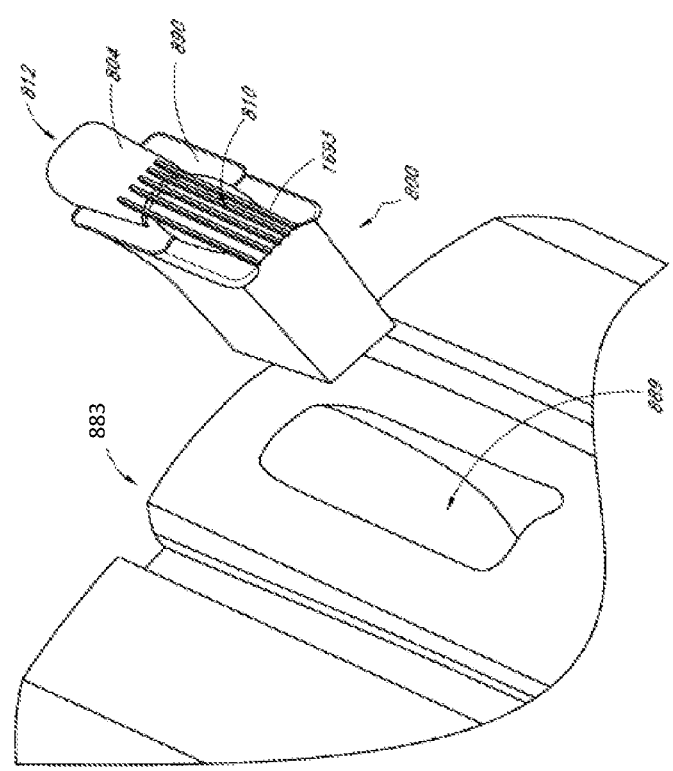
FIG. 5 is a partial perspective bottom-side view of the pump system of FIGS. 1A and 1B positioned near an opening in a kayak.
Figure 6:
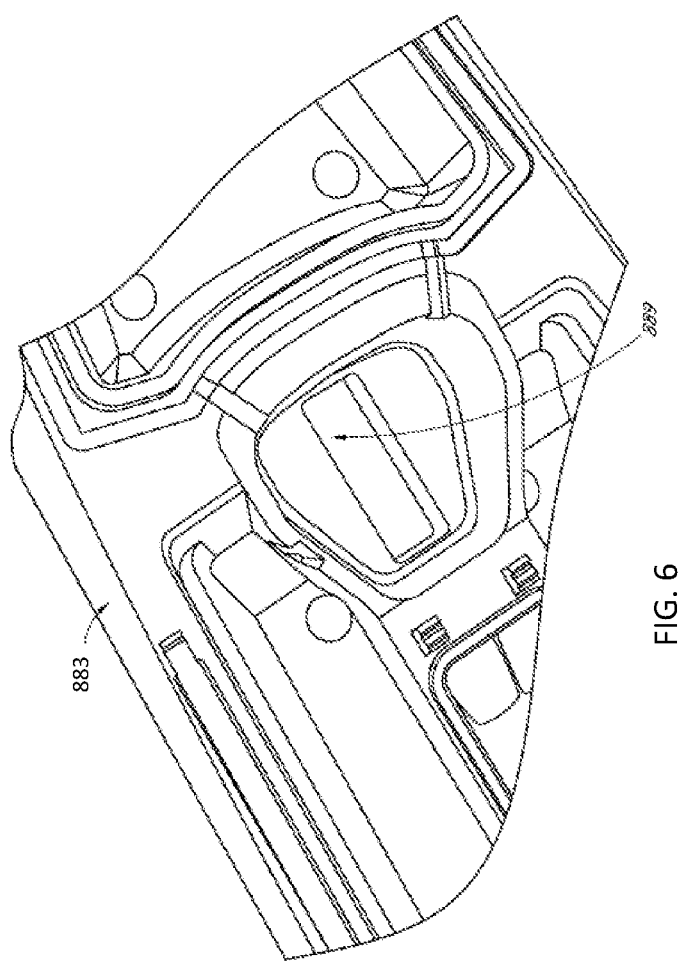

FIGS. 1A-8 depict a pump system 800 that can connect to a personal watercraft. The pump system 800 is generally constructed to be insertable into pre-fabricated openings through commercially available kayaks, although the pump system 800 may also be used in other types of personal watercrafts, for example, surfboards, inflatable watercrafts, dinghies, life rafts, tenders, sail boards, stand up paddle boards ("SUP boards"), and canoes, among others. In some embodiments, the pump system 800 can be used with other watercrafts, including boats (for example yachts, skiffs, pontoon boats, houseboats, motorboats, Jon boats, sail boats, fishing boats, etc.) pool toys, and jet skis. One example of a kayak 883 that can be used with embodiments of the pump system 800 is shown in FIG. 12. Another example of a kayak 1300 that can be used with embodiments of the pump system 800 is shown in FIGS. 31-33. Although the embodiments described herein may refer to kayak 883 or kayak 1300, the embodiments can be used interchangeably with either kayak 883, 1300 as well as other types of watercraft. As shown in FIG. 12, the kayak 883 may include a plastic molded hull 890. The hull 890 generally has a base 891 with some sidewalls 892 extending out from the base 891 that form a cockpit 893. The cockpit 893 can receive a user and/or various gear. Example openings 889 are visible in the partial views of the kayak 883 that is shown in FIGS. 5 and 6. FIG. 6 shows a section of a bottom portion of kayak 883 including the opening 889. FIG. 6 shows a top view of a section of kayak 883 including the opening 889. These views will be described in greater detail below. In some embodiments, the pump system 800 may not require a pre-fabricated opening in the watercraft for use.

FIGS. 1A and 1B show perspective views of the pump system 800. FIG. 1A shows a top perspective view and FIG. 1B shows a bottom perspective view. The pump system 800 includes a housing 820. The housing 820 may include a removable top cover 821. The cover 821 may be removable to allow access to the interior of the housing 820. The housing 820 may form a watertight enclosure 827 or "dry box." The housing 820 may also define (or partially define, as will be explained below) a flow path extending 825 there through. The housing may include a water intake port 810 and a water exhaust port or nozzle 812. The water intake port 810 is configured to draw water into the housing 820 and the water exhaust port 812 expels it, providing thrust for a watercraft incorporating the pump system. As will be shown below, the pump system may include one or more electric motors coupled to one or more drive shafts and impellers configured to accelerate the water through the flow path 825. The impeller may be positioned within the flow path 825. As seen in FIGS. 1A and 1B, the housing 820 may include a removable pump body 804 partially defining the flow path. The removable pump body 804 may include a water exhaust port 825. In some embodiments, the removable pump body 804 may be omitted and the housing 820 may fully define the flow path 825. The water intake port 810 may be covered by a grate 1693. The grate 1693 protects the user from contact with the impeller, while still allowing water to be drawn into the flow path 825. The grate 1693 may be removable. In some embodiments, the grate 1693 is omitted. In some embodiments, one or more ports 891 may extend through the housing 820. The ports 891 may be watertight ports that allow electrical connection (for example, for connecting the internal components of the pump system 800 to a power source, for charging, or for control). The housing 820 may be configured in size and shape to be received into an opening in a watercraft, for example, an opening in a kayak (as shown in FIGS. 5 and 6, below). The housing includes a flange or securement plate 890 extending at least partially around the bottom edge of the housing 820. The securement plate 890 may include features (for example, openings for receiving screws or other fastening methods, or surfaces for applying adhesives) that can be used to secure the pump system 820 to a watercraft.

Figure 2:
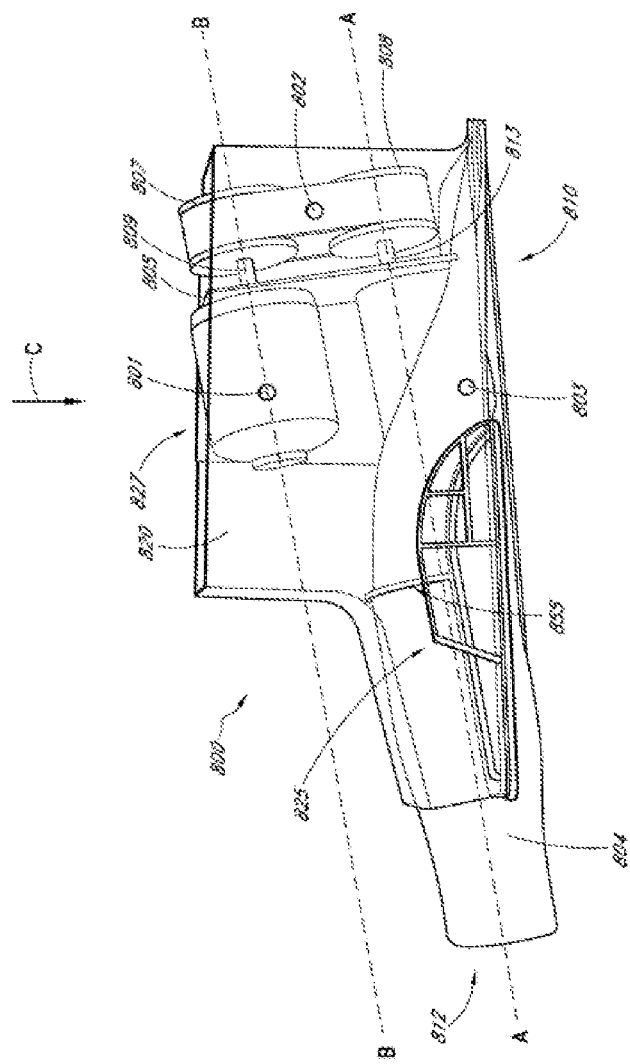
FIG. 2 is a side, partially transparent, schematic view of the pump system of FIGS. 1A and 1B. The housing is illustrated as transparent showing some of the internal components of the pump system.

Turning to FIGS. 2 and 3, some of the internal components of the pump system 800 are shown. In FIGS. 2 and 3, the housing 820 is illustrated as transparent, thus allowing a view of some of the internal components of the pump system 800. As mentioned above, the housing 820 defines a watertight enclosure 827, which may safely house the internal components of the pump system 800 in a dry environment. In broad terms, a drive system for the pump system may include an electric motor 801 coupled to a drive shaft 813 and impeller by a belt drive 802. The enclosure 827 may house other components as well. For example, the enclosure 827 may further house a motor controller, one or more batteries, an air pump, a wireless receiver, a wireless transmitter, one or more motor control systems, battery control systems, and/or sensors (including water sensors), among other components. A motor control system, for example, as described in reference to FIGS. 22 and 23, may be configured to activate or deactivate the motor, control the speed of the motor and/or the amount of power supplied to the motor, and/or control other motor functions. By adjusting the power of the motor, a user can adjust the thrust a pump system produces.

FIG. 22 illustrates a control mechanism 680 for controlling a motorized personal watercraft. Control mechanism 680 has a processor 690 for coordinating the operation of the control mechanism 680. The processor 690 is coupled to an accelerometer 700. The accelerometer 700 measures acceleration. These measurements are communicated to processor 690. Processor 690 may also communicate with accelerometer 700 for the purpose of initializing or calibrating accelerometer 700. In one embodiment, accelerometer 700 is a 3-axis accelerometer and can measure acceleration in any direction. Processor 690 is also coupled to memory 710. In one example, memory 710 is used to store patterns or profiles of accelerometer readings which have been associated with particular motor control commands. For example, memory 710 may store a pattern of accelerometer readings which has been previously associated with a command to cause the motor controller to activate the motors. The processor 690 can compare the current accelerometer 700 outputs to the previously stored profiles to determine whether the current outputs should be interpreted as a motor command. Control mechanism 680 also has a radio transmitter 720 coupled to the processor 690. In one embodiment, radio transmitter 720 transmits information received from processor 690, such as motor commands, to a radio receiver.

FIG. 23 illustrates one implementation of a method 740 for using the control mechanism 680 of FIG. 22. At step 745, output is received from the accelerometer. In one embodiment, the output from the accelerometer may be an analog signal representative of the acceleration measured along each axis measured by the accelerometer. In another embodiment, an analog to digital converter may be used to convert the output to a digital representation of the analog signal. Alternatively, the accelerometer may be configured to output digital signals. For example, the accelerometer itself may be configured to output a digital pulse when the acceleration detected on each axis exceeds some threshold amount.

After the output from the accelerometer is received, the control mechanism compares the output to pre-determined command profiles as shown in step 750. These command profiles may also be referred to as accelerometer output patterns or simply as patterns. For example, the control mechanism may store a pattern corresponding to a repeated positive and negative acceleration substantially along a particular axis. Another pattern may correspond to an isolated positive acceleration along a particular axis. The patterns of accelerometer outputs may be associated with particular commands for the motor controllers. For example, one pattern may correspond to a command to activate a subset of the available motors. Another pattern may correspond to a command to activate one or more available motors with a particular duty cycle or at a particular percentage of maximum operation potential.

The comparison of the current accelerometer output to the command profile results in a determination of whether the output matches a particular command profile, as shown in step 755. In one embodiment, if the current output does not match a command profile, the output from the accelerometer is discarded and the method concludes, leaving the control mechanism to wait for more output from the accelerometer. However, if the current output does match a command profile, the control mechanism transmits the corresponding command to the motor controllers, as shown in step 760. After the transmission, the command mechanism may again wait for additional output from the accelerometer.

In alternative embodiments, the control mechanism may operate without the need for pattern comparison. For example, in one embodiment, the control mechanism may be configured to interpret accelerometer readings as a proxy for throttle control. In one embodiment, the magnitude and duration of the accelerometer output may be directly translated into magnitude and duration signals for the motor controllers. For example, an acceleration reading above a particular threshold may be interpreted as a command to activate the motors. The duration of the command may be a proportional to the duration for which the acceleration reading is received.

FIG. 24 illustrates one possible embodiment for the control mechanism 680. In this embodiment the control mechanism is encapsulated in a package 790 which is integrated into a paddle 780. It will be appreciated by one of ordinary skill in the art that the term integrated into the paddle may comprise being attached to the surface or within the structure of paddle 780. In one embodiment the package 790 is a watertight package. In one embodiment, package 790 comprises a plastic box. In another embodiment, package 790 comprises layers of other materials. Advantageously, this embodiment facilitates control of the kayak while maintaining the ability of the user to use her hands for normal paddling activity. For example, rather than positioning one hand on a throttle to control the pump system 800, the normal motion of the user's paddle can be used to control the pump system 800. For example, it may be desirable for the motor controller to activate the motors while the user would normally be paddling. Accordingly, when the control mechanism is embedded in a paddle 780, the control mechanism may be configured to recognize the acceleration experienced by a user's paddle during the paddling motion as a command to engage the motors. Alternatively, the control mechanism may be configured to activate the motors in response to patterns which, though not necessarily paddling related, require less effort or distraction than involved in manually manipulating a throttle. For example, while paddling, rather than adjusting a throttle, the user might simply shake her paddle 780 to engage or disengage the motor. Accordingly, the user is able to control the motors of the kayak with less effort and coordination than would be required to manipulate the throttle embedded in body of a kayak. In an alternative embodiment, the packaged control mechanism 790 may also be attached to or integrated into a wrist strap, glove, or other clothing or accessory.

The electric motor 801 may be mounted to plate 805 at an angle with respect to the horizontal. In some embodiments, the angle may be any angle less than 90° from the horizontal. For example, the angle may be about 10°, 15°, 20°, 25°, 30°, 35°, 40°, and/or about 45° from horizontal. The electric motor 801 may include an electric motor drive 809 that is coupled to a motor-side pulley 807. The motor-side pulley 807 may be coupled to a drive shaft-side pulley 808 with a belt 802. The drive shaft-side pulley 808 may be coupled to a drive shaft 813. The drive shaft 813 may pass through a water-tight passageway such that water cannot pass from the flow path 825 into the watertight enclosure 827. A similar construction is shown in FIG. 4 and described above.

As shown in FIG. 2, the motor shaft or output shaft may be positioned on axis B and the drive shaft may be positioned on axis A. The two axes may be substantially parallel. In addition, the electric motor 801 may be positioned above and overlap at least a portion of the drive shaft 813. Thus, when looking down into the housing 820 in the direction of arrow C, the motor is at least partially superimposed over the drive shaft. In some embodiments, the two axes need not be parallel. In some embodiments, the electric motor 801 may be mounted below the drive shaft 813. In some embodiments, the electric motor 801 and the drive shaft 813 may be mounted side by side. The drive shaft 813 may be coupled to an impeller positioned within the flow path 825. In the illustrated embodiment, the impeller and the electric motor 801 are both mounted on the same side of the plate 805. In this configuration, the electric motor 801 and impeller are both located rearward from the belt 802, that is, closer to the rear water exhaust port 81. In some embodiments, the motor shaft and drive shaft 813 can be configured in a linear arrangement (for example both the motor shaft and the drive shaft 813 are on the same axis). In other embodiments, the motor shaft is installed in a direct drive orientation (for example the motor shaft connects directly to the impeller). In some embodiments, a belt 802 and drive shaft 813 are eliminated in a direct drive orientation. In other embodiments, the impeller and motor shaft are connected through common mechanical connectors (for example shaft couplers and bearings) when in a direct drive orientation. A larger electric motor drive 809 can be used with the electric motor 801 when the electric motor 801 is installed in a direct drive or linear orientation. A larger electric motor drive 809 can increase the efficiency of the pump system 800, as the pump system 800 can move the similar amounts of water as other pump system arrangements with less amp draw.

As described above and shown again in FIG. 2, the flow path 825 includes a water intake port 810 and a water exhaust port 812. The flow path may be formed by the removable pump body 804 coupled to a flow housing 803 at interface 855. In this embodiment, the removable pump body 804 includes water exhaust port 812. The flow housing 803 may include the intake port 810. The intake port 810 may face in a generally downward direction and may draw water up through the intake port 810 and into the flow path. The intake port 810 may be at least partially covered by one or more grates. An impeller, positioned in the flow path 825, may be rotated causing water to be drawn up though the intake port 810 and directed through the flow housing 803 towards the water exhaust port 812. Water can then flow past the impeller and out of the water exhaust port 812.

In some embodiments, the pump system 800 is powered with compressed air. In some of these embodiments, the pump system 800 includes a pneumatic motor within the drive system. The pneumatic motor can replace the electric motor 801 within the drive system and can be linked and coupled to other pump system 800 components in a similar way as the electric motor 801. Compressed air can be supplied to the pneumatic motor, which is the fuel source for the pneumatic motor. The power from the pneumatic motor drives the drive shaft 813, either through a direct drive arrangement or through an indirect arrangement, which in turn powers the impeller and causes water to be drawn and expelled through the flow path 825. In some of these embodiments, canisters holding compressed air can be stored within the kayak 883. These canisters can be made from carbon fiber or other lightweight material. The canisters can couple to the pneumatic motor through an air hose, which links a valve from the canister to a valve within the pneumatic motor. In some embodiments, a user can replace a depleted canister with a new canister by disconnecting the air hose from the depleted canister and connecting the hose to the new canister. In some embodiments, the canister can form a stress member of the kayak 883. In some of these embodiments, the canister can be utilized as a container for compressed air and form a part of the kayak 883 body. For example, the canister can take the shape of a side of the kayak 883. When assembled, the canister can be installed as the side of kayak 883. The canister can take the shape of other parts of the kayak 883 besides a side of the kayak 883, such as, for example, the hull, bow, and stern. In some embodiments, the canisters can replace the need for the pump system 800 to house batteries. In some embodiments, the pump system 800 may include both an electric motor 801 and pneumatic motor. In some of these embodiments, both the electric motor 801 and pneumatic motor can be used to operate the same impeller. In other embodiments, the electric motor 801 is used in one pump system 800 while the pneumatic motor is used in a second pump system 800.

FIG. 4 illustrates the pump system 800 shown with the cover 821 removed, partially showing the interior of the housing 820. The plate 805 and electric motor 801 can be seen.

FIG. 5 illustrates a pump system 800 installed within an opening in the kayak 883. In FIG. 5, only a portion of the kayak 883 is shown, the bow and stern of the kayak are omitted. The kayak 883 shown in FIG. 5 may be substantially similar to the kayak 883 of FIG. 12, where a complete view of the kayak 883 is provided. As discussed above, many commercially available kayaks have one or more openings formed there through. The openings may be used to bail water from the kayak and/or to gain access to the water. For example, fishing equipment and/or fish finding equipment may be inserted into and secured within such openings.

In the partial view of FIG. 5, the pump system 800 is removed from the opening 889 in the kayak 883. The opening 889 may be formed in the body of the kayak 883 and configured in size and shape to receive the pump system 800. In other words, the pump system 800 is configured to be inserted into the opening 889. In some embodiments, the opening 889 extends entirely through kayak 883, while in other embodiments, the opening 889 is merely a recess, extending only partially through the kayak 883. In some embodiments, the opening 889 may be a pre-fabricated opening formed in commercially available kayaks. In some embodiments, the opening 889 may be cut into an existing kayak in a shape that is configured to receive the pump system 800.

As shown, the intake port 810 is facing in a downward direction (in other words, away from the bottom surface of the kayak 883). In some embodiments, the pump system 800 includes an underside having a substantially planar surface and the intake port 810 is positioned on the substantially planar surface. One or more grates 1693 may be positioned over the intake port 810. In the embodiment shown in FIG. 5, the underside of the pump system 800 also includes the securement plate 890. The securement plate 890 may be sized such that the securement plate 890 extends out from the opening 889 in the kayak 883. That is, the securement plate 890 at least partially overlaps the bottom surface of the kayak 883 when the pump system is inserted into the opening 889. The securement plate 890 may be secured to the underside of the kayak 883 to hold the pump system 800 in place. In this way, the pump system 800 may be inserted into the opening 889 in the kayak 883 from below. However, in other embodiments, the pump system 800 may be sized and shaped such that it is insertable from above. In other embodiments, the pump system 800 may be sized and shaped such that it is insertable from above and below. The pump system 800 may be secured to the kayak 883 at the top side and/or the bottom side of the kayak 883. In some embodiments, the water intake port 810 may be configured to extend perpendicular (or at some other angle less than perpendicular) to the bottom side of the kayak 883. For example, in some embodiments, the flow path 825 may comprise a substantially straight tube extending below the kayak 883 and parallel to the bottom side of the kayak 883.

FIG. 6 is a partial perspective top-side view of the kayak 883 having an opening 889 there through. Again, the kayak 883 may be substantially similar to the kayak 883 shown in FIG. 12. In FIG. 6, various recesses and other features formed in the body of the kayak 883 are illustrated. However, these features need not be present in all embodiments. Moreover, the stern and the bow of the kayak 883 are not shown. The portion of the kayak 883 illustrated in FIG. 6 may represent a portion of the kayak towards the bow of the kayak, in the middle of the kayak, or towards the stern of a kayak, or any other portion there between. Accordingly, in various embodiments, the opening 889 for receiving the pump system 800 may be located at various positions along the length of the kayak. In some embodiments, the opening may be centered over the keel of the kayak, that is, centered across the kayak's width. However, this need not be the case in all embodiments. As shown, the opening 889 extends through the kayak 883 and is surrounded by sidewalls. The sidewalls may prevent the egress of water into other areas of the kayak 883. The pump system 800 may be configured to be easily inserted and removed from the opening 889. In this way, the opening 889 may be used for multiple purposes. For example, a user can insert the pump system 800 into the opening 889 to integrate a propulsion source into the kayak, or the user may remove the pump system 800 from the opening 889 and use the opening 889 for another purpose, for example, with a fish finder or to drain water from the kayak 883. In some embodiments, the pump system 800 may be easily removed for service. In some embodiments, the pump system 800 may include one or more rechargeable batteries. The pump system 800 may include a charging port (for example port 889 in FIGS. 1A and 1B) and/or a battery management system. In some embodiments, the pump system 800 may be removed from the kayak 883 in order for the batteries to be charged using a wall outlet. In some embodiments, the pump system 800 can be separated from the battery management system. For example, a user can remove the battery management system while leaving the remaining pump system 800 intact and connected with kayak 883. The user could charge the battery management system while the battery management system is disconnected from the pump system 800 and/or replace the removed battery management system with a second battery management system.

Figure 7:
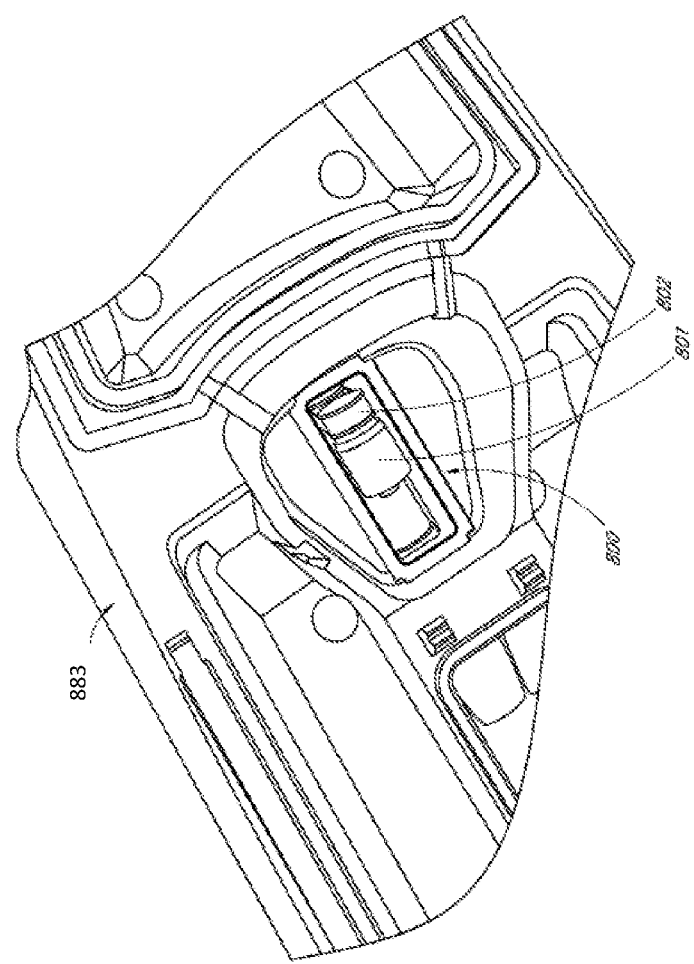
FIG. 7 is a perspective top-side view of the pump system of FIGS. 1A and 1B secured within an opening in a kayak.

FIG. 7 is a partial perspective top-side view of a kayak 883 having a pump system 800 inserted through the opening 889 in the kayak 883. In the illustrated embodiment, the portion of the kayak 883 shown is the same as that shown in FIG. 6. As shown, the cover 821 of the housing 820 has been removed and the electric motor 801 and belt drive 802 can be seen. As shown in FIG. 8, in some embodiments a plurality of batteries 950 may be positioned on top of the pump system 800. The batteries 950 may be held in place by the sidewalls surrounding the opening 889 in the kayak 883. The batteries 950 may include a separate housing and/or may be located anywhere on or within the kayak 883, including within the housing 820. In some embodiments, batteries 950 may be located at a distance away from the where the pump system 800 is installed within the kayak 883. As such, a length wiring may be needed to connect the batteries 950 to the pump system 800. In some embodiments, the wiring may extend down through an opening or scupper hole within the kayak 883 and along the underside of the kayak 883 and connected to an underside of the pump system 800.

In some embodiments, a second pump system 800 can be positioned next to a first pump system 800. In these embodiments, the second pump system 800 is identical to the first pump system 800 and is positioned within the same opening 889. In these embodiments, both the first and second pump systems 800 can operate independently of each other. Thus, the first pump system 800 can operate while the second pump system 800 is disabled and vice versa. Additionally, both pump systems 800 can operate simultaneously. In some embodiments, the dual pump system 800 can utilize a single exhaust port. In these embodiments, water received from either intake value 810 of the first and second pump system 800 is expelled out a single exhaust port 812.

The pump system 800 described herein can be scaled in size to meet the requirements of larger and smaller watercraft. For example, when installed in a larger watercraft (for example yacht), the pump system 800 can include larger components, such as a larger motor 801, pump body 804, intake port 810, and exhaust port 812, so as to allow the pump system 800 to move more water through the pump system 800. The pump system can also be powered with different power sources when the size of the pump system is changed. For example, in a smaller watercraft (for example pool toy), the pump system 800 can be powered from common household batteries (for example AA batteries), whereas in a larger watercraft, the pump system can be powered off of a large external power source (for example the yacht's battery or power source). Other modifications can be made to the pump system 800 so the pump system 800 can accommodate different sized watercraft. For example, the pump system 800 can be installed in multiple locations along the underside of a watercraft. In some embodiments, the pump system 800 can be installed near both the bow and stern of the watercraft. In other embodiments, the pump system 800 can be installed near both the port and starboard sides of the watercraft. Installing the pump system 800 at different locations on a watercraft can improve maneuverability. For example, installing a pump system 800 on the starboard side of the watercraft can allow an operator to (1) propel the watercraft forward and (2) turn the watercraft to the left. In other embodiments, 2, 3, 4, 5, 6, 7, 8, 9, or 10 pump systems 800 can be installed in the watercraft. Other modifications can include installing a diverter (for example diverter plate) at the end of the exhaust port 812 so that thrust from the pump system 800 can be directed in a new direction (for example left, right, or rearward of the exhaust port 812). In some embodiments, the exhaust port 812 can be connected to a joint or hinge, which allows the pump system to change the direction of the thrust by pivoting the exhaust port 812. In some embodiments, the pump system 800 can be used to stabilize a watercraft. For example, the exhaust port 812 can be installed in a vertical orientation, allowing the pump system 800 to direct thrust in a downward or upward direction. Directing thrust downwards or upwards can stabilize a watercraft by preventing the watercraft from rocking.

FIGS. 9-11, 14-16 depict a pump system 800 connected to the bottom of kayak. The pump system 800 depicted in FIGS. 9-11, 14-16 is substantially similar to the pump system depicted in FIGS. 1A-8 above. Both pump systems can have the same components and can operate in the same manner. However, the pump system 800 can be positioned within the kayak in a different manner.

As shown in FIGS. 9-11, 14-16, the pump system 800 is installed within a recess 887 of the kayak 883. The recess 887 is an indent or space in the base 891 of the kayak 883. In some embodiments, the recess 887 conforms to the general shape of the pump system 800. For example, the recess 887 can have an about rectangular shape to conform to the shape of the pump housing 820 as depicted in FIG. 16. In other embodiments, the recess 887 forms a space that allows a pump system 800 to be positioned and installed within. The recess 887 can be formed when the kayak 883 is manufactured. In some embodiments, the recess 887 is formed during a molding process. For example, the mold for a kayak can have the shape of the recess 887 carved within the mold such that when the mold is used to manufacture a kayak, the recess 887 will be formed into the kayak automatically. In other embodiments, the recess 887 can be machined into a preexisting kayak. In some embodiments, a combination of using a mold and machining is used to form a recess 887.

As shown in FIG. 9, when installed, the pump system 800 may not extend substantially from the underside of the kayak 883. In some embodiments, the pump system 800 extends no more than three inches from the base 891 of the kayak 883. In other embodiments, the pump system 800 extends no more than two inches from the base 891 of the kayak 883. In still other embodiments, the pump system 800 extends no more than one inch from the base 891 of the kayak 883. In still other embodiments, the pump system 800 is flush with the base 891 of the kayak 883. In some embodiments, because the pump system 800 does not extend beyond the base 891 of the kayak 883, the pump system can be operated anywhere that the kayak 883 can be, including in shallow water. As further shown in FIG. 9, the mounting plate 890 is secured to the base 891 of the kayak 883. The mounting plate 890 is used to secure the pump system 800 to the kayak 883 while the pump system 800 is positioned within the recess 887. The mounting plate secures the pump system 800 to the kayak 883 through common fasteners (for example bolt and nut) or with a sealant (for example silicon). Additional views of portions of the underside of the kayak 883 with installed pump system 800 are shown in FIGS. 10 and 11.

FIGS. 14-16 depict a bottom view of the pump system 800. As shown in FIGS. 14-16, the exhaust port 812 can be positioned within a recess 816. The recess 816 has a base 817 with two sidewalls 818 extending out from the base. In some embodiment, the base 817 is about parallel with the base 891 of the kayak 883. As shown in FIG. 16, the base 816 can be angled upwards at about 30 degrees with respect to the base 891 of the kayak 883. In some embodiments, the sidewalls 818 are about perpendicular with the base 817. In other embodiments, the sidewalls 818 are angled outwards from perpendicular. The sidewalls can be angled outwards from about perpendicular to about 120 degrees with respect to the base 817. As shown in FIG. 15, the recess 816 can form a V-shape, or U-shape, profile. This profile is formed due to the sidewalls 818 being wider towards the base of the exhaust port 812 and narrower towards the end of the recess 816. This profile can increase thrust by constricting water as it exits the exhaust port 812. In some embodiments, sidewalls 818 are narrower at the base of the exhaust port 812 and wider towards the end of the recess. In other embodiments, the sidewalls are about parallel with respect to each other. Positioning the exhaust port 812 within the recess 816 can increase the pump system's 800 efficiency by reducing drag. In some embodiments, water may be expelled from the exhaust port 812 towards the recessed portion 816 to create a Coanda Effect. As used herein, the term "Coanda Effect" refers to the tendency of a fluid jet to be attracted to a nearby surface, for example, the recessed portion 816. During operation, bubbles can form on the base 891 of the kayak 883 as the exhaust port 812 expels water. These bubbles create a slippery surface on the base 891 of the kayak 883, which reduces drag. This slippery surface effect can be increased by positioning the exhaust port 812 toward the middle or the bow of the kayak 883. Positioning the exhaust port towards the middle or bow of the kayak 883 reduces drag for more of the base 891 of the kayak 883, as the bubbles will travel across more of the base 891.

As shown in FIG. 14, the exhaust port 812 can have an oval-shaped end 815. The oval-shaped end 815 can increase thrust from water expelled from the exhaust port 812. The oval-shaped end 815 operates as a nonintrusive flow straightener. As a result, the water expelled from the exhaust port 812 forms a tight rope and maintains the tight rope shape over a long distance (for example, about 25 feet). By creating a tight rope of water that holds its shape over long distances, the exhaust port 812 increases the thrust and efficiency from the pump system 800. In some embodiments, the water exhaust port 812 has a constricted end. The constricted end can increase the acceleration of the water as it flows out of the water exhaust port 812.

The pump housing 820 extends into the recess 887 of the kayak 883. In some embodiments, the pump housing 820 does not extend into the cockpit and is instead fully contained within the recess 887. In some embodiments, when the pump system 800 is mounted to the kayak 883, the pump system 800 forms a watertight seal with the kayak 883 at the recess to prevent water from entering into the recess. In some embodiments, a hood is placed over the part of the pump housing 820 that is positioned within the recess 887. The hood will form a watertight seal with the pump components to prevent water from entering into the pump housing 820. In other embodiments, the recess 887 has an opening to allow access to the cockpit. The opening can be positioned anywhere within the recess 887 and is sized allow for wiring to travel into the cockpit. The wiring can be used to connect controllers, external batteries, and other devices to the pump system 800. In some embodiments, a post extends from the cockpit and through the opening. Wiring can be placed within the post. In some embodiments, a user can remove the external batteries while within the cockpit without having to uninstall the pump system 800. The user can then charge the external batteries or replace the external batteries without having to uninstall the pump system 800.

In some embodiments, grate 300 can be installed over the intake port 810. Grate 300 can be sized and shaped to cover the intake port 810 and intake port recess 814. For example, as shown in FIGS. 25-26, grate 300 is oval shaped and can cover both the intake port 810 and the intake port recess 814 depicted in FIG. 16. Grate 300 can have several openings 302 formed on the face 301 of the grate 300 that extend through the grate 300. The openings 302 can be arranged in a checkered pattern, as depicted in FIGS. 25-26, and can extend across the most of the grate 300. In some embodiments, the openings 302 do not cover most of the grate 300, and instead cover only a part of the grate 300, such as, for example, about one-quarter, one-third, one-half, two-thirds, or three-quarters of the grate 300. In some embodiments, the openings 302 are arranged in a different pattern, such as, for example, linear or swirl. The openings 302 are formed at an angle with respect to the face 301. The openings 302 can be formed at an angle of about 5, 10, 15, 20, 25, 30, 35, 40, 45, 50, 55, or 60 degrees. In some embodiments, the openings 302 are tapered. Forming the openings 302 at an angle or tapering the openings 302 improves the grate's 300 ability to prevent objects from blocking the intake port 810 while still allowing water to enter the intake port 810. To further improve the intake port's 810 ability to intake water, the intake port 810 can be installed in a tilted position, as shown in FIG. 16 for example, so that the intake port 810 is substantially parallel with the openings 302. In other embodiments, the grate 300 is installed in a tilted position so that the intake port 810 is substantially parallel with the openings 302. Because the openings 302 are about parallel with intake port 810, water can enter the intake port 810 unobstructed. In some embodiments, the intake port 810 is installed so the intake port 810 is not parallel with the openings 302 so as to further prevent debris from entering into the intake port 810. The grate 300 can be formed from a number of materials, which can include, for instance, metal (for example, aluminum or steel), metal alloy (for example, aluminum alloys), carbon fiber reinforced plastic, or a plastic material. The grate 300 can be manufactured using a variety of different materials and methods. The grate may be made by any suitable process, such as, for instance, machining, milling, water jet cutting, laser cutting, stamping, pressing, sheet metal drawing, molding (for example, injection molding), casting, rapid prototyping using additive manufacturing techniques, or any combination thereof.

In some embodiments, a user can remove the batteries from the pump system 800 without uninstalling the pump system 800 from the kayak 883 (for example, removing the pump system 800 from the recess 887). In some of these embodiments, the batteries are located in a compartment within the pump housing 820. The battery compartment is installed on the exterior of the pump housing 820. In some embodiments, the compartment is installed into the pump housing 820 by forming a threaded connection between the compartment and the pump housing 820. In other embodiments, the battery compartment is installed through other methods, including, but not limited to, fasteners, key and pin, and latches. When installed, the compartment is partially exposed on the underside of the kayak 883, allowing a user to access and uninstall the compartment without uninstalling the pump system 800. In some of these embodiments, the user only needs to remove the battery compartment from the kayak 883 and can leave the rest of the pump system 800 installed. In some embodiments, a user can charge the batteries while the batteries remain in the pump system 800. In some of these embodiments, the user charges the batteries through a charging port, similar to the charging ports described herein, on the pump system.

FIGS. 28-33 depict a pump system 1000 configured to be placed within a recess 1106 of a kayak 883, 1300. In some embodiments, the pump system 1000 depicted in FIGS. 28-33 is substantially similar to the pump system 800 depicted in FIGS. 1A-8, 9-11, and 14-16 above. These pump systems 800, 1000 can operate in the same or similar manner and produce the same or similar operational results. However, in some embodiments, the pump system 1000 includes different components.

In some embodiments, the pump system 1000 includes a hatch 1002, a power unit body 1008, a motor 1006, motor contacts 1004, a drive shaft 1012, a shaft cover 1010, an impeller 1014, a flow straightener 1016, and a pump nozzle 1018. The hatch 1002 can connect to the power unit body 1008 through a snap fit, friction fit, bonding, or other mechanical means. In some embodiments, the connection between the hatch 1002 and the power unit body 1008 forms a watertight seal that prevents water from entering inside the hatch 1002 or power unit body 1008. Installed inside the power unit body 1008 is the motor 1006. The motor may be sealed between the power unit body 1008 and the hatch 1002 when the hatch 1002 is installed on the power unit body 1008. The shaft cover 1010 may connect to the lower section of power unit body 1008. The shaft cover 1010 can form a watertight seal with the power unit body 1008 so as to prevent water from entering inside the power unit body 1008. The drive shaft 1012 maybe configured to be installed within the shaft cover 1010. The drive shaft 1012 connects to the motor 1006. In some embodiments, the drive shaft 1012 connects to the motor 1006 by being installed in a direct drive arrangement with the motor 1006. In other embodiments, the drive shaft 1010 connects to the motor 1006 through a gear box or belt system. In some embodiments, the drive shaft 1012 can contain one or more O-ring or other sealant placed on the outer half of the drive shaft. The O-ring or sealant can prevent water from entering inside the power unit body 1008 through the inside of the shaft cover 1010. Connected to the end of the drive shaft 1012 is an impeller 1014. The impeller 1014 can be installed on the end of the drive shaft 1012 through several mechanical means, including, for example, threading onto the drive shaft, bonding, welding, snap fit, or friction fit. In some embodiments, the impeller 1014 is an axial impeller. In some embodiments, the impeller 1014 has a symmetrical design, where the blades of the impeller 1014 are symmetrical about the centerline. This symmetrical design allows the blades of the impeller 1014 to create the same flow pattern no matter which side of the impeller 1014 is mounted to the drive shaft 1012. The flow straightener 1016 is installed on one end of the impeller 1014. In some embodiments, the flow straightener does not contact the impeller 1014 when installed within the pump system 1000. In some of these embodiments, the flow straightener 1016 is positioned within the power unit body 1008. In other embodiments, the flow straightener 1016 is installed within the pump nozzle 1018. The pump nozzle 1018 connects to the power unit body 1008. In some embodiments, the pump nozzle 1018 is installed on a lower end of the power unit body 1008.

The pump system 1000 may use other components as well. For example, the power unit body 1008 can further house a motor controller, one or more batteries, an air pump, a wireless receiver, a wireless transmitter, one or more motor control systems, battery control systems, and/or sensors (including water sensors), among other components.

The pump system 1000 can be installed inside a recess 1106 of a kayak 883, 1300. The recess 1106 can be formed on the base 1301 of a kayak 1300. A recess wall 1100 can extend upward from the base 1301 of the kayak 1300. The recess wall 1100 is sized and shaped in a manner that allows for the pump system 1100 to be placed within the recess 1106 so that bottom section of the power body unit 1008 is about flush with the base 1301 of the kayak 1300, as depicted in FIGS. 30-32. In some embodiments, the recess 1106 and recess wall 1100 is substantially similar to the recess 887 described herein. Once positioned within the recess 1106, the pump system 1000 can be held in place through various mechanical and chemical means, including, for example, clamps, fasteners, bonding, welding, friction fit, or snap fit. In some embodiments, a mounting plate is used to mount and hold the pump system 1000 in place. Once installed, the pump system 1000 can form a watertight seal with the recess wall 1100 so as to prevent water from entering into the recess 1106. In some embodiments, a grate 1200 can be placed over the front compartment 1020. The grate 1200 can have one or more (for example, 2, 3, 4, 5, 6, 7, 8, 9, 10, or more) bars extending across the front compartment 1020. The grate 1200 can prevent or restrict debris from entering into the pump system 1000 while still permitting water to enter into the pump system 1000. In some embodiments, the grate 1200 can be replaced with the grate 300 described herein. The motor contacts 1004 can contact and form a connection with the motor controller 1102. The motor controller 1102 can be accessible to a user of the kayak 1300 while the user is seated within the kayak 1300. In some embodiments, the user will need to remove an access hatch to access the motor controller 1102. In other embodiments, the motor controller 1102 is readily accessible to the user without the user needing to remove or open any additional equipment. The motor controller 1102 can be connected to an external battery through a set of cables 1104. Because the external battery is connected to the cables 1104, the external battery can be installed within the kayak 1300 at multiple locations, including locations that allow the external battery to be easily accessible by the user. In some embodiments, a user can replace the external battery without having to uninstall any part of the pump system 1000. The external battery can be used to power the motor 1006. Once the external battery is installed, the motor controller 1102 can distribute power to the motor 1006.

The pump system 1000 operates by drawing water in through the front compartment 1020 on the power unit body 1008. Water is drawn into the front compartment 1020 due to the motor 1006 driving the impeller 1014. In some embodiments, the impeller 1014 reduces the pressure of the water, creating suction downstream of the impeller 1014 (e.g. creates suction near the front compartment 1014). Reducing the water pressure draws the water through the front compartment 1020 and into the power unit body 1008. The water drawn into the front compartment 1020 travels over the impeller 1014, which assists with moving the water through the pump system 1000. After the water travels over the impeller 1014, the water travels over the flow straightener 1016, causing the water to form a laminar flow (e.g. the flow straightener reduces or removes the spin on the water created by the impeller). The water then exits the pump system 1000 at the pump nozzle 1018, creating a jet of water that propels the kayak 1300 forward. In some embodiments, water can be drawn in through the pump nozzle 1018 and expelled out of the front compartment 1020. In some of these embodiments, the motor 1006 can spin the impeller 1014 in the opposite direction of normal operation. Spinning the impeller 1014 in the opposite direction can lower the water pressure on the opposite side of the impeller 1014 (e.g. on the side near the pump nozzle 1018), causing water to be drawn in through the pump nozzle 1018 and directed to the front compartment 1020. This reverse flow creates thrust in the reverse direction, propelling the kayak 1300 in the aft direction. The pump system 1000 can be controlled through the motor controller 1102. In some embodiments, the motor controller 1102 can be configured to control the pump system 1000 in a manner as described with other embodiments herein. For example, the motor controller 1102 may be configured to activate or deactivate the motor 1006, control the speed of the motor 1006 and/or the amount of power supplied to the motor 1006, and/or control other motor 1006 functions. By adjusting the power of the motor 1006, a user can adjust the thrust a pump system 1000 produces. The motor 1006 can receive power through an external power source, such as an external battery. The external battery can be connected to the pump system 1000 through cables 1104.

In some embodiments, the recess 1106 can have sidewalls and a base. These sidewalls and base can be shaped similarly to the sidewalls 818 and a base 817 described herein. For example, the recess 1106 can form a V-shape or U-shape profile on the end near the pump nozzle 1018. This profile can increase thrust by constricting water as it exits the pump nozzle 1018. In some embodiments, water may be expelled from the pump nozzle 1018 towards the sloped area of the recess 1106 to create a Coanda Effect. During operation, bubbles can form on the base 1301 of the kayak 1300 as the pump nozzle expels water. These bubbles create a slippery surface on the base 1301 of the kayak 1300, which reduces drag. This slippery surface effect can be increased by positioning the pump nozzle 1018 toward the middle or the bow of the kayak 1300. Positioning the pump nozzle 1018 towards the middle or bow of the kayak 1300 reduces drag for more of the base 1301 of the kayak 1300, as the bubbles will travel across more of the base 1301.

In some embodiments, the pump nozzle 1018 can have an oval-shaped end. The oval-shaped end can be similar to the oval-shaped end 815 described herein in both size and function. For example, the oval-shaped end can increase thrust from water expelled from the pump nozzle 1018. The oval-shaped end can operate as a nonintrusive flow straightener. As a result, the water expelled from the pump nozzle 1018 forms a tight rope and maintains the tight rope shape over a long distance (for example, about 25 feet). By creating a tight rope of water that holds its shape over long distances, the pump nozzle 1018 can increase the thrust and efficiency from the pump system 1000. In some embodiments, the pump nozzle 1018 has a constricted end (e.g. one end is narrower than the other end). The constricted end can increase the acceleration of the water as it flows out of the pump nozzle 1018.

In some embodiments, the pump system 1000 can powered by compressed air. In some of these embodiments, the motor 1006 is a pneumatic motor which can be powered by air. The cables 1104 can connect to an air tank and the motor controller 1102 can assist with regulating air flow to the motor. In some embodiments, a second pump system 1000 can be installed on base 1301 of a kayak 1300. The second pump system 1000 can function substantially similar to the first pump system 1000. In some embodiments, the first and second pump systems 1000 can operate and be constructed similarly to the dual pump system 200 described herein.

FIGS. 17, 18, and 27 depict a dual pump system 200 that can be placed within a recess 210 of a kayak 883. The dual pump system 200 has a housing 201 which can hold two pump systems 800. As depicted in FIGS. 18, 27, the pump systems 800 can share a sidewall 203, which separates the pump systems into individual compartments. In some embodiments, the dual pump system does not have a sidewall 203 and the pump systems 800 share a single compartment. The dual pump system 200 can be placed within a dual recess 210, such as, for example, the dual recess 210 depicted in FIG. 27. The dual recess 210 can include two or more individual recess 211, 212, with those individual recesses 211, 212 being sized, shaped, and functionally similar to recess 887 described herein. In some embodiments, the dual pump system 200 is generally the size of the dual recess 210. In other embodiments, the dual recess 210 is slightly larger than the dual pump system so that the dual pump system 200 can be positioned within the dual recess 210 without contacting the walls of each individual recess 211, 212. In other embodiments, the dual recess 210 is a single, large space with no compartment wall 213 in-between the individual recesses 211, 212. Once installed within the dual recess 210, the housing 201 forms a water-tight seal with the base 891 so that the recess 887 is sealed. In other embodiments, a hood is placed over the part of the housing 201 that is positioned within the dual recess 210. The hood will form a watertight seal with the pump components to prevent water from entering into the pump housing 820. Both the first and second pump systems 800 can operate independently of each other. Thus, the first pump system 800 can operate while the second pump system 800 is disabled and vice versa. Additionally, both pump systems 800 can operate simultaneously. In some embodiments, the dual pump system 200 can utilize a single exhaust port 812. In these embodiments, water received from either intake value 810 of the first and second pump system 800 is expelled out a single exhaust port 812. The dual pump system can be secured to the recess 210 by using the mounting studs 202 located throughout the housing.

FIGS. 19 and 20 depict a pump system 1620. When installed, the pump system 1620 connects to the base of kayak while positioned within a recess 887. In one embodiment, the recess 887 forms a tear-drop shaped aperture in the base 891. The tear-drop shaped aperture may be complimentary to the shapes of the insert 1614 and/or pump system 1620 such that the insert 1614 and/or pump system 1620 can be oriented and/or positioned in a desired configuration within the recess 887.

The insert 1614 may comprise a solid or substantially ring-shaped sheet structure configured to cover at least a portion of the recess 887. The insert 1614 may be coupled to the recess 887 using various coupling means, for example, adhesives, bonding agents, and/or fasteners. In some embodiments, by virtue of the complimentary shapes of the insert 1614 and the recess 887, the insert 1614 may be form fitted within the recess 887 such that the engagement there between inhibits longitudinal, lateral, and/or transverse motion of the insert 1614 relative to the recess 887. When disposed within the recess 887, the insert 1614 can define a receiving space 1616 for receiving the pump system 1620.

In some embodiments, the insert 1614 may include one or more protrusions 1651 configured to be inserted into one or more indentations 1659 (shown in FIG. 19) on the pump system 1620. The protrusions 1651 and indentations 1659 on the pump system 1620 can have complimentary shapes such that the protrusions may be received by the indentations by sliding the pump system 1620 forward longitudinally relative to the insert 1614. The engagement of the protrusions 1651 and corresponding indentations can result in one or more abutments that act to arrest or inhibit longitudinal, lateral, and/or transverse movement of the pump system 1620 relative to the insert 1614 and body 1600.

The insert 1614 may also include a latch element 1653 that is cantilevered from a latch plate 1655. The latch element 1653 may catch one or more surfaces within a receptacle 1661 (shown in FIG. 8) on the pump system 1620 when the pump system 1620 is received within the insert 1614 to secure the pump system 1620 in the longitudinal direction relative to the insert 1614. In this way, the pump system 1620 may be slid forward into the insert 1614 until the latch 1653 releasably engages a notch or other feature on the insert 1614 such that the pump system 1620 is aligned and secured relative to the insert 1614. To remove the pump system 1620 from the insert 1614, the latch element 1653 may be depressed by applying a force to the cantilevered end of the latch element 1653 to disengage the latch element from the notch or other feature. Disengaging the latch element 1653 then will allow a user to slide the pump system 1620 backward longitudinally relative to the insert 1614 to release the protrusions 1651 from the indentations 1659.

The base surface 1622 of the pump system 1620 may be configured to substantially match the adjacent base 891 of a kayak 883 to achieve a desired hydrodynamic profile of the personal watercraft. The base surface 1622 may also include a charging port 1631 and/or activation switch 1633. Thus, the pump system 1620 may be charged when the system is coupled to the kayak 883 or when it is separate from the kayak 883. In embodiments when these are provided, the charger port 1631 can be disposed on an opposite side of the pump system 1620 and the activation switch 1633 can be disposed elsewhere as well if desired.

As shown in FIGS. 19 and 20, the pump system 1620 may comprise a drive system including one or more motors 1675. In one embodiment, the drive system can be at least partially housed between a pump base 1671 and a pump cover 1657. The one or more motors 1675 can be powered by one or more batteries 1665 and can be mounted to the pump base 1671 by motor mounts 1677. In some embodiments, each motor 1675 can be coupled to a motor shaft 1690 by a shaft coupler 1679, shaft bearing 1681, bearing holder 1683, and spacer 1685. Each shaft 1690 can be coupled to an impeller 1699 that is disposed at least partially within a pump housing 1695 and a bearing 1697 can optionally be disposed between each shaft and the impeller 1699. In this way, the one or more motors 1675 can drive each impeller 1699 to draw water through the pump housing 1695 to propel the pump system relative to a body of water.

In some embodiments, each shaft 1690 can be disposed within a shaft housing 1694 that is configured to limit the exposure of the shaft 1690 to objects that are separate from the pump system 1620. Thus, the shaft housing 1694 can protect a user from inadvertently contacting the shaft 1690 during use and/or can protect the shaft 1690 from contacting other objects, for example, sea grass. Additionally, the shaft housing 1694 can improve performance of the pump system 1620 by isolating each shaft 1690 from the water that passes through the pump housing 1695. In some embodiments, each shaft 1690 can be protected from exposure to the water by one or more shaft seals 1692.

The pump system 1620 can also include one or more grates 1693 disposed over intake ports of the pump housing 1695. In some embodiments, a grate 300 is installed over the intake ports of the pump housing 1695. The grates 1693 can limit access to the impeller 1699 and shaft 1690 to protect these components and/or to prevent a user from inadvertently contacting these components during use. In some embodiments, each pump housing 1695 and/or grate 1693 can be coupled to one or more magnetic switches (not shown) that can deactivate the motors 1675 when the pump housing 1695 and/or grate 1693 are separated from the pump base 1671. Therefore, the one or more magnetic switches may prevent the cassette from operating without the optional grate 1693 and/or pump housing in place.

With continued reference to FIGS. 19 and 20, the drive system may also include one or more motor controllers 1673 for each motor 1675, one or more relays 1687 configured to connect the one or more batteries 1665 with the one or more motor controllers 1673, an antenna 1667, and a transceiver 1669. The one or more motor controllers 1673, one or more relays 1687, one or more batteries 1665, antenna 1667, and transceiver 1669, can be electrically connected to each another by one or more wiring harnesses 1663. The transceiver 1669 can include or be coupled to wireless transmission circuitry that is configured to transmit electromagnetic and/or magnetic signals underwater.

FIG. 21 depict a pump system 800 connected to the bottom of the kayak. The pump system 800 depicted in FIG. 21 is substantially similar to the pump system depicted in FIGS. 1-11, 14-16 above. These pump systems 800 can have the same components and can operate in the same manner. However, the pump system 800 depicted in FIG. 21 can be installed on the kayak in a different manner.

In FIG. 21, the base 891 of kayak 883 has a several scupper holes. As used herein, the term "scupper hole" refers to an opening within a kayak that can be used to drain water from the kayak. When installed, the pump system 800 connects to the base 891 of kayak 883 by connecting the pump system to the scupper holes. The pump system 800 connects to the scupper holes through a rod (not pictured). The rod is attached to the pump system 800 such that the rod extends in an about vertical direction. When installed, the rod extends through a scupper hole and into the cockpit 893. The rod is then secured in the cockpit and thereby connecting the pump system 800 to the kayak 883. In some embodiments, the rod is secured by using a mounting plate, which secures the rod in place while fastening to the cockpit 893. In some embodiments, the rod is secured by tying the rod to a handle or other device within the cockpit 893. In some embodiments, the pump system 800 can be mounted to the kayak 883 using a different number of scupper holes, including, for example, 1, 2, 3, 5, 6, 7, 8, 9, or 10 scupper holes. In some of these embodiments, multiple rods are connected to the pump system 800 and extend through multiple scupper holes. In some embodiments, the rod is detachable from the pump system 800 and can be connected to the pump system 800 at different points along the pump housing 820, allowing a user to select where the rod is secured. In some of these embodiments, the rod can be adjusted to accommodate the scupper hole layout of different kayaks. In some embodiments, the rod prevents water from entering the cockpit 893 through the scupper holes. In some of these embodiments, the rod has a diameter that pressed against the inside of the scupper hole, which effectively seals the scupper hole. In other embodiments, a separate sealant, such as a gasket or cap, can be placed around the rod and into the scupper hole, which effectively seals the scupper hole.

The rod can include one or more motor controllers or interface for the pump motor. The rod can also include relays, batteries, antennas, and transceivers. The one or more relays can be configured to connect the one or more batteries with the one or more motor controllers an antenna and a transceiver. The one or more motor controllers, one or more relays, one or more batteries, antenna, and transceiver, can be electrically connected to each another by one or more wiring harnesses as discussed above with other figures. In some embodiments, the batteries can be removed from the rod without having to remove the rod from the pump system 800 or uninstall the pump system 800 from the kayak 883.

Figure 13A:
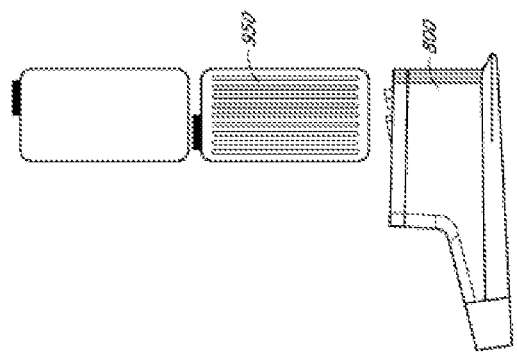
Figure 13B:
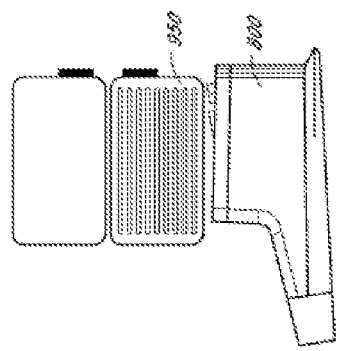
Figure 13C:
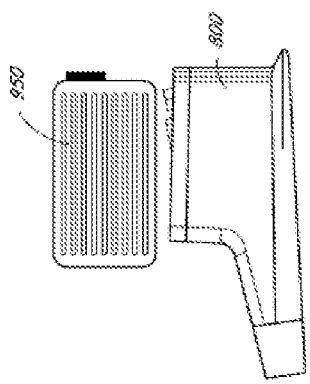
Figure 13D:
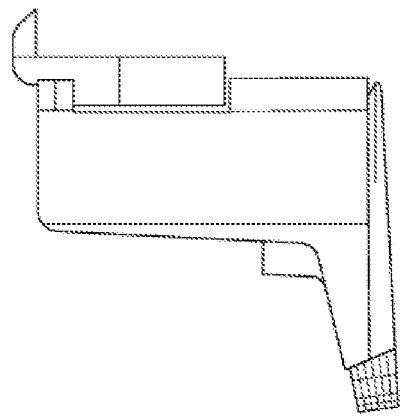
Figure 13E:
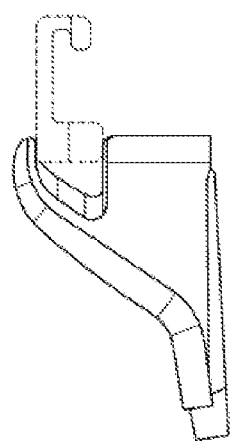
Figure 13F:
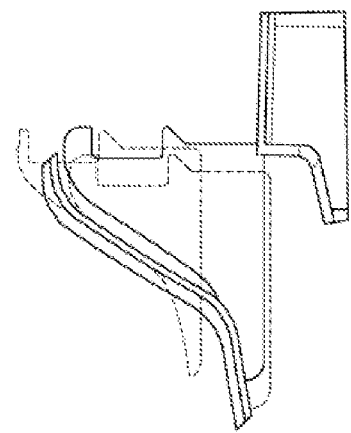

Turning now to FIGS. 12 and 13A-F, it will be understood that in some embodiments, the pump system 800 may be coupled to the stern of a kayak 883. For example, a motor mount 880*a*, 880*b*, and 880*c* may include a receiving space, or pump housing, in the bottom side of the motor mount. The receiving space may be shaped to receive the pump system 800 inserted from below. A mounting bracket 884 may be positioned over the transom of the stern of the kayak 883 and be configured to be coupled to the motor mount at location 881. The motor mount 880*a*, 880*b*, 880*c* may be rotatable with respect to the mounting bracket 884. A tiller (not shown) may be coupled to the motor mount 880*a*, 880*b*, 880*c*. In another embodiment, foot pedals may be installed in the kayak 883 such that manipulation of the foot pedals causes the rotation of the motor mount with respect to the mounting bracket. In FIG. 12, batteries 950 that power the pump system 800 are located on the kayak 883. However, as shown in FIG. 13A-13C, motor mounts may include space for one or more batteries 950. For example, FIG. 13 shows the arrangement of a pump system 800 and two batteries 950 within a motor mount (the motor mount itself is shown in FIG. 13D). FIG. 13B illustrates an additional embodiment of an arrangement of two batteries 950 and the pump system 800 (the corresponding motor mount is shown in FIG. 13E). FIG. 13C illustrates an embodiment of an arrangement of one battery 950 and pump system 800 (the corresponding motor mount is shown in FIG. 13F).

Any of the pump systems described herein may be configured to turn off when the pump system is flipped over and/or tossed about in the water. As such, in some embodiments, the pump system includes at least one sensor configured to detect the orientation and/or movement of the pump system. The sensor may comprise an accelerometer and/or a gyroscope. In other embodiments, the sensor comprises a sensor configured to detect water in the flow path. When there is no water detected in the flow path, the sensor may cause the motor to stop. In some embodiments, the sensor is connected to a switch which disengages the power supply from the motor when the switch receives a signal from the sensor. In some embodiments, the power supply is disconnected from the motor when a gyroscope detects that the pump system's position is inverted and/or rotated. In some embodiments a circuit is coupled to one or more sensors and configured to disconnect the power source from the electric motor based at least in part on sensor detection of the orientation of the pump system.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present disclosure is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" and "about parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A self-propelling watercraft system, comprising:
    a hull comprising:
        a base, the base having recess, and
        a plurality of sidewalls extending from the base to form a cockpit; and
    a pump system detachably connected to the hull and positioned within the recess, the pump system comprising:
        an intake port on a first end of the pump system, the intake port configured to intake water;
        a nozzle on a second end of the pump system opposite the first end, at least a portion of the nozzle positioned within the recess and configured to jettison water received in the pump through the intake port;
        a grate covering the intake port;
        a plurality of oval-shaped openings formed on a face of the grate and extending through the grate at an angle between 5 and 60 degrees with respect to the face; and a reversible impeller configured to operate in forward and reverse rotational directions, the impeller having a symmetrical design such that the impeller generates substantially same thrust in the forward and reverse rotational directions when operating at the same number of revolutions per minute.

2. The self-propelling watercraft system of claim 1 further comprising a motor mechanically connected to the pump system.

3. The self-propelling watercraft system of claim 2, wherein the motor is connected to the pump system in a direct drive orientation.

4. The self-propelling watercraft system of claim 2 further comprising a battery detachably connected to the motor and accessible from within the cockpit.

5. The self-propelling watercraft system of claim 2 further comprising a motor controller connected to the motor, the motor controller configured to control outputs of the motor.

6. The self-propelling watercraft system of claim 1, wherein the nozzle is oval-shaped.

7. The self-propelling watercraft system of claim 6, wherein in operation the oval-shaped nozzle increases thrust from water expelled from the pump system by operating as a nonintrusive flow straightener.

8. The self-propelling watercraft system of claim 6, wherein the oval-shaped nozzle has a constricted end such that in operation the oval-shaped nozzle increases water velocity as it flows out of the nozzle.

9. The self-propelling watercraft system of claim 1 further comprising a flow straightener connected to the nozzle, the flow straightener configured to reduce turbulence of the jettisoned water and form a laminar flow when the pump system is in normal operation.

10. The self-propelling watercraft system of claim 1, wherein the pump system is configured to be powered by compressed air.

11. The self-propelling watercraft system of claim 10 further comprising a pneumatic motor and canisters configured to hold the compressed air.

12. The self-propelling watercraft system of claim 1, wherein the nozzle is positioned at about the center of the hull.

13. The self-propelling watercraft system of claim 1 further comprising:
a second pump system detachably connected to the hull, the second pump system positioned in parallel to the pump system, the second pump system comprising:
a second intake port on a first end of the second pump system, the second intake port configured to intake water; and
a second nozzle on a second end of the second pump system opposite the first end,
the second nozzle configured to jettison water received in the pump system through the intake valve.

14. The self-propelling watercraft system of claim 13 further comprising:
a first motor mechanically connected to the first pump system in a direct drive orientation; and
a second motor mechanically connected to the second pump system in a direct drive orientation.

15. The self-propelling watercraft system of claim 1, wherein the self-propelling watercraft is a kayak.

16. The self-propelling watercraft system of claim 1, wherein the pump system extending from the recess extends no more than one inch from the base of the hull.

17. The self-propelling watercraft system of claim 16, wherein the pump system extending from the recess is substantially flush with the base of the hull.

18. The self-propelling watercraft system of claim 1, wherein the nozzle is exposed and configured to jettison water received in the pump system from the intake port and to agitate water surrounding the nozzle.

19. The self-propelling watercraft system of claim 1, wherein a water flow path is substantially flat or linear between the entrance and exit of the pump system.

20. The self-propelling watercraft system of claim 1, wherein the portion of the recess near the nozzle has a V-shape or U-shape profile allowing for the nozzle to be exposed, wherein in operation, the profile increases thrust by constricting water as it exits the pump nozzle, and wherein in operation, water expelled from the nozzle towards the recess creates a Coanda Effect as the expelled water is attracted to the surface of the recess and the hull.

21. The self-propelling watercraft system of claim 20, wherein in operation, bubbles form on the base of the hull from water exiting the pump nozzle, which creates a slippery surface on the base of the hull and reduces drag.

22. The self-propelling watercraft system of claim 21, wherein the pump nozzle is positioned towards the middle or bow of watercraft system so that bubbles travel across more of the base, which further reduces drag.

* * * * *